United States Patent
Calabro et al.

(10) Patent No.: US 12,463,723 B2
(45) Date of Patent: Nov. 4, 2025

(54) DIGITAL FILTER ARRANGEMENT FOR COMPENSATING GROUP VELOCITY DISPERSION IN AN OPTICAL TRANSMISSION SYSTEM

(71) Applicant: Huawei Technologies Co., Ltd., Shenzhen (CN)

(72) Inventors: Stefano Calabro, Munich (DE); Changsong Xie, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 382 days.

(21) Appl. No.: 18/146,176

(22) Filed: Dec. 23, 2022

(65) Prior Publication Data

US 2023/0129067 A1  Apr. 27, 2023

Related U.S. Application Data

(63) Continuation of application No. PCT/EP2020/068086, filed on Jun. 26, 2020.

(51) Int. Cl.
*H04B 10/2525* (2013.01)
*H04B 10/61* (2013.01)

(52) U.S. Cl.
CPC ..... *H04B 10/25253* (2013.01); *H04B 10/614* (2013.01)

(58) Field of Classification Search
CPC ................................................ H04B 10/25253
(Continued)

(56) References Cited

U.S. PATENT DOCUMENTS 6,167,102 A * 12/2000 Hellberg ............. H04L 27/2657
327/107
9,264,145 B2  2/2016 Randel et al.
(Continued)

FOREIGN PATENT DOCUMENTS

CN  102439879 A  5/2012
CN  102439930 A  5/2012
(Continued)

OTHER PUBLICATIONS

Juha et al; Optimization of Flexible Filter Banks Based on Fast-Convolution; 2014; IEEE International Conference on Acoustic, Speech and Signal Processing (ICASSP); pp. 1-14. (Year: 2014).*

(Continued)

*Primary Examiner* — Amritbir K Sandhu
(74) *Attorney, Agent, or Firm* — Slater Matsil, LLP

(57) ABSTRACT

The present disclosure relates to a digital filter arrangement (DFA) for compensating group velocity dispersion (GVD) in an optical transmission system (OTS) wherein the DFA is configured to receive a sequence of samples of a digital input signal in the time domain in the form of consecutive blocks of size L. The DFA is configured to generate M discrete Fourier transforms of a current overlap block of a size N greater than the size L and of M−1 delayed versions of the current overlap block. The DFA is configured to filter the entries of the generated M discrete Fourier transforms to generate an output discrete Fourier transform with N entries, wherein the compensation filter is implemented by a delay network and a linear combination algorithm.

20 Claims, 8 Drawing Sheets

(58) Field of Classification Search
USPC .......................................................... 398/79
See application file for complete search history.

(56) References Cited

U.S. PATENT DOCUMENTS

| | | | | |
|---|---|---|---|---|
| 9,584,260 | B2* | 2/2017 | Fludger | H04B 10/614 |
| 2014/0105617 | A1* | 4/2014 | Shan | H04B 10/6161 |
| | | | | 398/208 |
| 2019/0123834 | A1* | 4/2019 | Zarubinsky | H04B 10/6971 |
| 2023/0129067 | A1* | 4/2023 | Calabro | H04B 10/6161 |
| | | | | 398/79 |

FOREIGN PATENT DOCUMENTS

| | | | | |
|---|---|---|---|---|
| EP | 3621261 A1 * | 3/2020 | ....... | H04L 25/03159 |
| JP | 2019036881 A * | 3/2019 | | |
| WO | WO-02086755 A1 * | 10/2002 | ......... | H03H 17/0213 |
| WO | WO-2010094342 A1 * | 8/2010 | ......... | H04B 10/6971 |
| WO | 2013139395 A1 | 9/2013 | | |
| WO | 2016034246 A1 | 3/2016 | | |

OTHER PUBLICATIONS

Yasir et al; Zero-Padding Techniques in OFDM Systems; Dec. 2018; International Journal on Electrical Engineering and Informatics—vol. 10, No. 4, pp. 1-22. (Year: 2018).*

Ing-Song Lin et al: "Overlapped Block Digital Filtering", IEEE Transactions on Circuits and Systems II: Analog and Digitalsignal Processing, Institute of Electrical and Electronics Engineers Inc, 345 East 47 Street, New York, N.Y. 10017, USA, vol. 43, No. 8, Aug. 1, 1996 (Aug. 1, 1996), XP011012568, total 12 pages.

M. G. Taylor, Coherent detection method using DSP for demodulation of signal and subsequent equalization of propagation impairments. G. Taylor, IEEE Photon. Technol. Lett., vol. 16, No. 2, pp. 674-676, Feb. 2004, total 3 pages.

S.J. Savory, G. Gavioli, R.I. Killey and P. Bayvel, Electronic compensation of chromatic dispersion using a digital coherent receiver, Opt. Express 15, pp. 2120-2126, Mar. 2007, total 7 pages.

S.J. Savory, Digital filters for coherent optical receivers, Proc. OFC, Paper OTuO3, Jan. 2008, total 7 pages.

K.-P. Ho, Subband equaliser for chromatic dispersion of optical fibre, IET Electronics Letters, vol. 45, No. 24, pp. 1224-1226, Nov. 19, 2009, total 3 pages.

I. Slim, A. Mezghani, L. G. Baltar, J. Qi, F. N. Hauske, and J. A. Nossek, Delayed Single-Tap Frequency-Domain Chromatic-Dispersion Compensation, IEEE Photonics Technology Letters, vol. 25, No. 2, pp. 167-170, Jan. 15, 2013, total 4 pages.

* cited by examiner

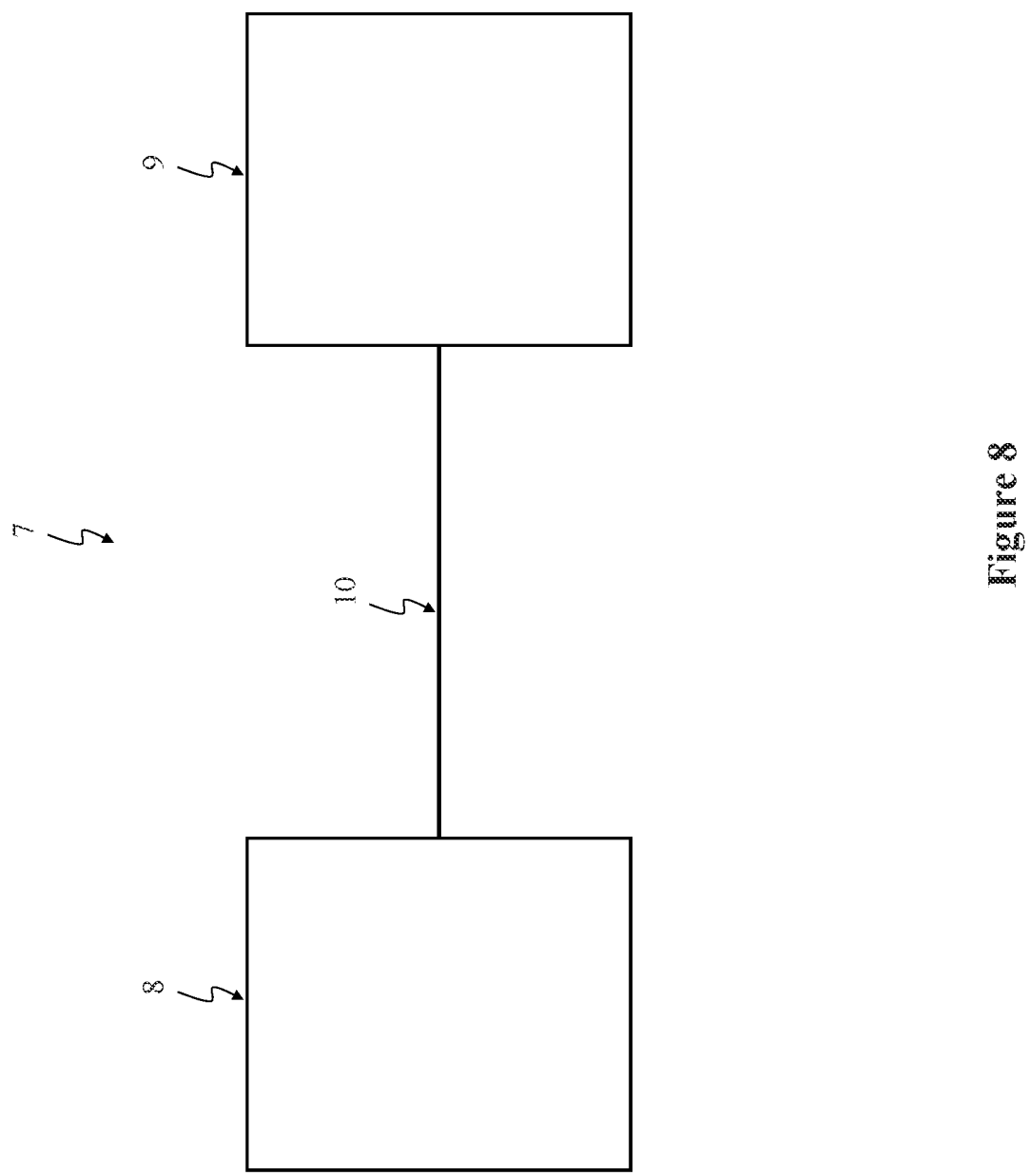

DIGITAL FILTER ARRANGEMENT FOR COMPENSATING GROUP VELOCITY DISPERSION IN AN OPTICAL TRANSMISSION SYSTEM

CROSS-REFERENCE TO RELATED APPLICATIONS

This application is a continuation of International Application No. PCT/EP2020/068086, filed on Jun. 26, 2020, the disclosure of which is hereby incorporated by reference in its entirety.

TECHNICAL FIELD

The present disclosure relates to a digital filter arrangement (DFA) for compensating group velocity dispersion (GVD) in an optical transmission system (OTS), a transmitter comprising such a DFA and a receiver comprising such a DFA. The present disclosure further relates to an optical transmission system (OTS) comprising such a transmitter and/or such a receiver and to a method for compensating GVD of an OTS using such a DFA.

BACKGROUND

Transmission of modulated light over an optical fiber is impaired by group velocity dispersion (GVD). The group velocity describes the speed at which a light pulse propagates via the optical fiber. In the presence of GVD, the group velocity of a light pulse varies over frequency, which results in pulse broadening and causes inter-symbol interference. In the fiber optics community, GVD is often referred to as chromatic dispersion (CD). The present disclosure is directed to compensating such GVD occurring in optical fibers using digital filters respectively a digital filter arrangement (DFA). Thus, the present disclosure is in the field of DFAs for compensating GVD in an optical transmission system (OTS), wherein the OTS may comprise one or more optical fibers, across which modulated light is transmitted for an optical communication.

SUMMARY

Embodiments of the present disclosure base also on the following considerations:

In single mode optical fibers (single mode fibers), GVD occurs as a consequence of waveguide dispersion and material dispersion. In single mode fibers, GVD is almost constant over the bandwidth of a single channel. As a consequence, the group delay may be approximately modeled as a linear function of the frequency. In modern optical systems it is common to modulate the amplitude, the phase and the polarization of the light and to recover the modulated information by means of coherent optical receivers.

A coherent optical receiver maps linearly the impinging light onto electrical signals. Since a single mode fiber carries two independent polarizations (X polarization and Y polarization) and each polarization (X and Y) conveys a passband signal with two independent quadrature components (I and Q), a coherent receiver maps the imping field onto two complex signals S1 and S2 (S1=$X_I$+j·$X_Q$, S2=$Y_I$+j·$Y_Q$, wherein j is the imaginary unit). The complex baseband signals are sampled and digitized to enable digital signal processing (DSP). A coherent receiver may post-compensate GVD by means of linear filters.

At the same way, a transmitter that is configured to modulate digital signals on the amplitude and the phase or, equivalently, on the quadrature components of the transmit signal may pre-compensate GVD by means of digital linear filters, independently of the detection technique used at the receiver.

GVD may be compensated individually on each polarization because it does not involve any interaction between orthogonal polarizations. Since GVD is a unitary effect, i.e. energy-preserving effect, it may be post- or pre-compensated by linear all-pass filters.

Therefore, by applying digital linear all-pass filtering to the complex baseband signals S1 and S2 (S1=P1·I+j·P1·Q, S2=P2·I+j·P2·Q, wherein j is the imaginary unit) either at the transmitter or at the receiver, the negative effect of GVD may be reverted, in principle without suffering from any degradation of the signal quality.

Linear all-pass filters may be approximated by digital finite impulse response (FIR) filters. FIR filters are desirable because they are inherently stable, also in finite-precision arithmetic, and may be realized via feed-forward structures.

However, in practice, very long FIR filters, i.e. filters with a great size, are required to compensate GVD. The filter length grows proportionally to the transmission distance and to the square of the symbol rate, and, the implementation complexity grows with the filter length. The terms "filter size" and "filter length" may be used as synonyms.

Therefore, whereas in theory GVD may be compensated perfectly by using digital linear filters, the complexity of digital GVD compensation for optical transmission systems, such as optical coherent transmission systems, grows rapidly with the transmission distance and the symbol rate, and becomes challenging in the case of long-haul, high-rate applications.

In view of the above-mentioned problems and disadvantages, embodiments of the present disclosure aim to reduce the complexity of GVD compensation using a digital filter arrangement (DFA). An objective is to provide a digital filter arrangement (DFA) for compensating GVD in an optical transmission system (OTS) with a reduced complexity of the GVD compensation.

The objective is achieved by the embodiments of the disclosure as described in the enclosed independent claims. Advantageous implementations of the embodiments of the disclosure are further defined in the dependent claims.

A first aspect of the present disclosure provides a digital filter arrangement (DFA) for compensating group velocity dispersion (GVD) in an optical transmission system (OTS), wherein the DFA is configured to receive a sequence of samples of a digital input signal in the time domain in the form of consecutive blocks of size L, wherein each block comprises L consecutive samples of the digital input signal. The DFA is configured to generate M discrete Fourier transforms of a current overlap block of a size N greater than the size L and of M−1 delayed versions of the current overlap block, by using M discrete Fourier transform (DFT) filters, wherein each generated discrete Fourier transform is of the size N and comprises N entries, the current overlap block comprises the samples of a current block and the N−L last consecutive samples of a directly previous block that was received by the DFA directly before the current block, and each DFT filter of the M DFT filters is implemented by a DFT algorithm, in particular by a fast Fourier transform, FFT, algorithm, of a size Γ smaller than the size N and by an interpolation algorithm.

The DFA is configured to filter, by a compensation filter, the entries of the generated M discrete Fourier transforms to generate an output discrete Fourier transform with N entries, wherein the compensation filter is implemented by a delay network and a linear combination algorithm.

Thus, the present disclosure proposes a filtering using a DFA, wherein the samples of a current block of a digital signal in the time domain are transformed into the frequency domain and then filtered, using a compensation filter, in the frequency domain. In other words, the DFA according to the first aspect is based on frequency domain filtering. The DFA may be configured to generate for a current block M discrete Fourier transforms of a respective current overlap block and of M−1 delayed versions of the current overlap block by using the M DFT filters.

As a result of the frequency domain filtering the complexity of the DFA according to the first aspect is reduced, because a frequency domain implementation of filtering comprises a lower complexity compared to time domain implementations. Namely, in contrast to a time domain implementation of filtering, in a frequency domain implementation of filtering the number of operations per sample grows logarithmically instead of linearly with the filter size. The term "length" may be used as a synonym for the term "size". In addition, as a result of using the M DFT filters the complexity of the DFA is further reduced. That is, the transformation of the samples from the time domain to the frequency domain using the M DFT filters requires a lower complexity compared to performing a normal DFT algorithm. Namely, for transforming a sequence of N samples from the time domain to the frequency domain a DFT algorithm of size N and, thus, a DFT filter of size N is normally required. In contrast thereto, the present disclosure proposes to use M DFT filters, wherein each DFT filter is implemented by a DFT algorithm of a size Γ smaller than the size N and by an interpolation algorithm. That is, the present disclosure proposes to reduce the size of the DFT algorithm from N to F and to compensate this reduction by additionally performing an interpolation algorithm.

Therefore, the present disclosure proposes with the DFA according to the first aspect a DFA with a reduced complexity by performing the filtering in the frequency domain and reducing the complexity of the transformation of the samples from the time domain to the frequency domain for the frequency domain filtering.

As outlined above, the DFT algorithm of the size Γ may optionally be a fast Fourier transform algorithm (FFT algorithm) of the size F.

The DFT algorithm of size Γ may optionally be performed by using a square DFT matrix of size F. That is, the transformation of samples from the time domain to the frequency domain may optionally be performed by using a DFT matrix of size F.

The discrete Fourier transform of samples (e.g. the samples of a current overlap block) corresponds to the transformation output respectively transformation result in the frequency domain of a DFT filter used for transforming the samples from the time domain, which are input to the DFT filter as samples in the time domain, to the frequency domain. That is, the discrete Fourier transform of samples corresponds to the transformation output of the DFT algorithm used for transforming the samples from the time domain to the frequency result.

The samples in the time domain (e.g. the samples of a current block or of a current overlap block) may correspond to a matrix comprising the samples in the time domain as entries. A discrete Fourier transform may correspond to a matrix with entries in the frequency domain. A vector is a special case of a matrix, namely a matrix with only one row or with only one column.

Therefore, for generating, on the basis of a matrix comprising the samples of the digital signal in the time domain as entries (such as the samples of a current block or current overlap block), the matrix of the corresponding discrete Fourier transform, the corresponding DFT filter may be used. The corresponding DFT filter may optionally be implemented by a square DFT matrix of the size Γ (implementing the DFT algorithm of the size F) and an interpolation algorithm.

The N entries of a discrete Fourier transform correspond to Fourier coefficients.

The output discrete Fourier transform is compensated with respect to the GVD.

According to an implementation form, the DFA is based on frequency domain filtering according to an overlap-save method or on frequency domain filtering according to an overlap-add method.

The DFA may be implemented by hardware and/or software.

As outlined already above, the term "group velocity dispersion (GVD)" may also be referred to as "chromatic dispersion (CD)".

In an implementation form of the first aspect, the DFA is configured to generate, on the basis of the output discrete Fourier transform, an output block of size N by using an inverse discrete Fourier transformation (IDFT) filter.

In an implementation form of the first aspect, the DFA is configured to generate an output block of the size L on the basis of the output block of the size N, by using an overlap-add or an overlap-save method.

Thus, the size of the output block may be reduced from the size N to the size L.

The overlap-save method may also be referred to by the terms "overlap-discard method" and "overlap-scrap method".

In particular, the size L of each block is the product of M and Δ (L=M·Δ), wherein M and A are each a positive integer.

Each block may be made of M subblocks of the size Δ.

In particular, the size N of the current overlap block is the product of Δ with the sum of M and m (N=Δ·(M+m)), wherein m is a positive integer, and wherein the product of Δ and m (Δ·m) corresponds to the number of last consecutive samples in the sequence of samples of the directly previous block.

The integer m corresponds to the number of last consecutive subblocks of the size Δ of the directly previous block.

In an implementation form of the first aspect, the DFA is configured to generate, on the basis of the current block, the current overlap block of the size N greater than the size L, generate the M−1 delayed versions of the current overlap block, and jointly approximate, on the basis of the current overlap block and the M−1 delayed versions of the current overlap block, the M discrete Fourier transforms by using the M DFT filters.

Thus, the overlapping for generating the current overlap block and the delaying for generating the M−1 delayed versions of the current overlap block may be performed in the time domain.

Optionally, the current overlap block and the M−1 delayed versions of the current overlap block may be delayed, wherein the relative delays among the blocks are not changed. In other words, the current overlap block may optionally comprise a base latency and the M−1 delayed versions of the current overlap block each may comprise additional latency.

The current overlap block may be generated by prepending to the current block the last N−L samples of the directly previous block.

In an implementation form of the first aspect, the DFA is configured to generate the M−1 delayed versions of the current overlap block by progressively delaying the current overlap block in steps of Δ samples.

The first delayed version of the M−1 delayed versions of the current overlap block may correspond to the current overlap block delayed by Δ samples, the second delayed version of the current overlap block may correspond to the current overlap block delayed by 2Δ samples, and so on. That is, the second delayed version may correspond to the first delayed version delayed by Δ samples, and so on. Therefore, the M−1$^{th}$ delayed version may correspond to the current overlap block delayed by (M−1)·Δ samples.

In an implementation form of the first aspect, the DFA is configured to split the current block into M subblocks each of a size Δ, wherein each subblock comprises Δ consecutive samples of the current block, and to zero-pad each subblock to a zero-padded sequence of the size Γ comprising F samples, wherein each zero-padded sequence comprises the Δ samples of the corresponding subblock and Γ-Δ zeros. Further, the DFA may be configured to jointly approximate, on the basis of the M zero-padded sequences, M further discrete Fourier transforms by using the M DFT filters. Furthermore, the DFA may be configured to generate the M discrete Fourier transforms by delaying the M further discrete Fourier transforms, and by aligning and adding one or more of the M delayed further discrete Fourier transforms and one or more of the M further discrete Fourier transforms.

The M further discrete Fourier transforms may be referred to as "input-pruned discrete Fourier transforms".

Each of the M further discrete Fourier transforms may correspond to a discrete Fourier transform with only a subset of non-zero input points.

In an implementation form of the first aspect, the DFA is configured to perform the alignment by performing a symbol-wise multiplication of one or more delayed further discrete Fourier transforms and/or one or more further discrete Fourier transforms by a rotation vector.

The symbol-wise multiplication may also be referred to as a point-wise multiplication.

The DFA may be configured to perform the alignment by performing a symbol-wise multiplication of one or more delayed further discrete Fourier transforms and/or one or more further discrete Fourier transforms by a rotation vector whose elements are powers of the elements of a base rotation vector.

$$\rho\_1_{M+m}\rho\_1_{M+m} \triangleq \exp\left(j\frac{2\pi}{M+m}[0, 1, \ldots, N-1]\right)$$

The base rotation vector may be as follows:

$$\rho\_1_{M+m}\rho\_1_{M+m} \triangleq \exp\left(j\frac{2\pi}{M+m}[0, 1, \ldots, N-1]\right),$$

wherein j is the imaginary unit.

In an implementation form of the first aspect, the DFA is configured to group the Δ samples of each subblock into two parts of samples, optionally into two equal parts of samples, to carry out the zero-padding of each subblock to a zero-padded sequence of the size Γ by adding Γ-Δ zeros between the two parts of samples, and to jointly approximate, on the basis of the M zero-padded sequences, the M further discrete Fourier transforms by using the M DFT filters, wherein each DFT filter is implemented by a FFT algorithm of the size Γ and an interpolation algorithm.

The DFA may be configured to group the Δ samples of each subblock into a first part (x+) of samples (first part comprising consecutive coefficients) and a second part (x−) of samples (second part comprising consecutive coefficients). The number of samples of the first and second part may optionally be the same. That is, the DFA may optionally be configured to group the Δ samples of each subblock into two equal parts of samples.

The first and second part may be arranged in the respective subblock, such that in the sequence of consecutive samples of the respective subblock the samples of the second part are arranged previous to the samples of the first part ([x−, x+]). That is, the samples of the second part may be arranged at the beginning and the samples of the first part may be arranged at the end of the respective subblock. Thus, the samples of the first part (x+) may follow the samples of the second part (x−) in the sequence of consecutive samples of the respective subblock.

In an implementation form of the first aspect, the zero-padding of each subblock generates a zero-padded sequence of the size Γ by adding Γ-Δ zeros between the first part of samples and the second part of samples of the respective subblock, wherein the positions of the first part and second part are swapped. That is, in the zero-padded sequence of consecutive samples, generated on the basis of each subblock, the first and second part of the respective subblock and the Γ-Δ zeros may be arranged, such that in the zero-padded sequence the samples of the first part (x+) are arranged previous to the samples of the second part (x−), wherein the Γ-Δ zeros are arranged between the first and second part ([x+, 0, . . . , 0, x−]). That is, the samples of the second part may follow the samples of the first part in the zero-padded sequence of consecutive samples of the respective subblock, wherein the Γ-Δ zeros are arranged between the first and second part. Thus, after zero-padding, the samples of the first part (x+) may be arranged at the beginning of the zero-padded sequence and the samples of the second part (x−) may be arranged at the end of the zero-padded sequence, wherein the Γ-Δ zeros are arranged between these two parts. The first part (x+) may be referred to as the front part (x_front) and the second part (x−) may be referred to as the tail part (x tail), wherein the terms "front" and "tail" refer to the positions of the two parts in the zero-padded sequence after the optional reordering described above.

Thus, the zero-padding of each subblock may entail a reordering of the two parts of samples of the respective subblock.

In an implementation form of the first aspect, the DFT is configured to jointly approximate on the basis of the M zero-padded sequences the M further discrete Fourier transforms by transforming each zero-padded sequence by an FFT algorithm of the size Γ to a discrete Fourier transform of the size F, interpolating the Γ samples of each discrete Fourier transform of the size Γ to N samples of another discrete Fourier transform of the size N by a low-pass filter, and performing a symbol-wise multiplication of the samples of each other discrete Fourier transform by a rotation vector to obtain the respective further discrete Fourier transform.

The symbol-wise multiplication of the samples of each other discrete Fourier transform by the rotation vector corresponds to a shift in the time domain of the non-zero samples of the respective zero-padded sequence.

$$\rho_{-2M+m}\rho_{-2M+m} \triangleq \exp\left(j\frac{\pi}{M+m}[0, 1, \ldots, N-1]\right)$$

The rotation vector may be as follows:

$$\rho_{-2M+m}\rho_{-2M+m} \triangleq \exp\left(j\frac{\pi}{M+m}[0, 1, \ldots, N-1]\right),$$

wherein j is the imaginary unit.

The interpolation may be implemented by using a polyphase finite impulse response (FIR) filter, wherein the input of the polyphase FIR filter is regarded as periodic.

In an implementation form of the first aspect, the compensation filter comprises N subfilters, wherein each subfilter is implemented by a delay network and a linear combination algorithm, and the DFA is configured to perform a filtering on the $k^{th}$ entry of one or more of the generated M discrete Fourier transforms by using the $k^{th}$ subfilter to generate the $k^{th}$ entry of the output Fourier transform, wherein each discrete Fourier transform comprises N entries. (k is an integer between 1 and N, k=1, . . . , N).

Each subfilter may comprise a single output and one or more inputs. In an implementation form, each subfilter may comprise a single output and multiple inputs. That is, each subfilter may be a multiple-input single-output filter.

In an implementation form of the first aspect, the compensation filter, in particular the $k^{th}$ subfilter, is configured to generate the $k^{th}$ entry of the output Fourier transform as a linear combination of the $k^{th}$ entry of one or more first discrete Fourier transforms of the M discrete Fourier transforms, and/or the $k^{th}$ entry of one or more delayed versions of one or more second discrete Fourier transforms of the M discrete Fourier transforms.

In other words, the compensation filter, in particular the $k^{th}$ subfilter, may be configured to generate the $k^{th}$ entry of the output Fourier transform as a linear combination of the $k^{th}$ entry of one or more discrete Fourier transforms (may be referred to as "one or more first discrete Fourier transforms") of the M discrete Fourier transforms, and/or the $k^{th}$ entry of one or more delayed versions of one or more discrete Fourier transforms (may be referred to as "one or more second discrete Fourier transforms") of the M discrete Fourier transforms.

The one or more delayed versions of a discrete Fourier transform may differ to each other by a delay of multiples of L samples in the time domain or a delay of multiples of blocks of the respective discrete Fourier transform in the frequency domain. That is, a delayed version of a discrete Fourier transform may correspond to the discrete Fourier transform delayed by a delay of multiples of blocks of the discrete Fourier transform in the frequency domain.

In an implementation form of the first aspect, some or all of the one or more first discrete Fourier transforms and of the one or more second discrete Fourier transforms may correspond to each other.

In an implementation form of the first aspect, the compensation filter, in particular the $k^{th}$ subfilter, is configured to perform the linear combination by weighting the $k^{th}$ entry of the one or more first discrete Fourier transforms, and/or the $k^{th}$ entry of the one or more delayed versions of the one or more second discrete Fourier transforms with a respective coefficient.

The compensation filter, in particular the $k^{th}$ subfilter, may be configured to linearly combine the $k^{th}$ entry of the one or more first discrete Fourier transforms and/or the $k^{th}$ entry of the one or more delayed versions of the one or more second discrete Fourier transforms by using one or more corresponding coefficients of the linear combination algorithm.

In an implementation form of the first aspect, the compensation filter, in particular the $k^{th}$ subfilter, is configured to generate the $k^{th}$ entry of each of the one or more delayed versions of each of the one or more second discrete Fourier transforms by delaying the $k^{th}$ entry of the respective second discrete Fourier transform using one or more integer delays.

The $k^{th}$ subfilter may be configured to generate, using the respective delay network, the $k^{th}$ entry of each of the one or more delayed versions of each of the one or more second discrete Fourier transforms by delaying the $k^{th}$ entry of the respective second discrete Fourier transform using one or more integer delays.

In an implementation form of the first aspect, the DFA is configured to optimize, by an optimization method, the one or more coefficients and/or the one or more integer delays with regard to the GVD compensation.

In order to achieve the DFA according to the first aspect of the present disclosure, some or all of the implementation forms and optional features of the first aspect, as described above, may be combined with each other.

A second aspect of the present disclosure provides a transmitter for an optical transmission system (OTS), wherein the transmitter is configured to transmit, on the basis of a digital signal, a modulated light signal via one or more optical fibers to a receiver and wherein the transmitter is configured to pre-compensate group velocity dispersion (GVD) of the modulated light signal on the basis of the digital signal using a digital filter arrangement (DFA) according to the first aspect or any of its implementation forms.

The transmitter comprises the DFA according to the first aspect or any of its implementation forms and, thus, is configured to pre-compensate GVD of the modulated light signal on the basis of the digital signal using the DFA.

The one or more optical fibers may correspond to one or more single mode fibers.

The transmitter of the second aspect and its implementation forms and optional features achieve the same advantages as the DFA of the first aspect and its respective implementation forms and respective optional features.

A third aspect of the present disclosure provides a receiver for an optical transmission system (OTS), wherein the receiver is configured to receive a modulated light signal via one or more optical fibers from a transmitter and to convert the received modulated light signal into a digital signal, and wherein the receiver is configured to compensate group velocity dispersion (GVD) of the received modulated light signal on the basis of the digital signal using a digital filter arrangement (DFA) according to the first aspect or any of its implementation forms.

The receiver comprises the DFA according to the first aspect or any of its implementation forms and, thus, is configured to compensate GVD of the received modulated light signal on the basis of the digital signal using the DFA.

The one or more optical fibers may correspond to one or more single mode fibers.

In case the optical fiber is a single mode fiber, the receiver may be configured to map the received modulated light signal onto two complex signals S1 and S2 with two independent quadrature components I and Q (S1=$X_I$+j·$X_Q$, S2=$Y_I$+j·$Y_Q$, wherein j is the imaginary unit). Namely, a single mode fiber carries two independent polarizations (X polarization and Y polarization) and each polarization (X and Y) conveys a passband signal with two independent quadrature components I and Q.

In an implementation form of the third aspect, the receiver may be a coherent-detection receiver.

The receiver of the third aspect and its implementation forms and optional features achieve the same advantages as the DFA of the first aspect and its respective implementation forms and respective optional features.

In order to achieve the receiver according to the third aspect of the present disclosure, some or all of the implementation forms and optional features of the third aspect, as described above, may be combined with each other.

A fourth aspect of the present disclosure provides an optical transmission system (OTS), wherein the OTS comprises one or more optical fibers, a transmitter and a receiver. The transmitter is configured to transmit, on the basis of a first digital signal, a modulated light signal via the one or more optical fibers to the receiver. The receiver is configured to receive the modulated light signal via the one or more optical fibers from the transmitter and convert the received modulated light signal into a second digital signal. The transmitter is a transmitter according to the second aspect or any of its implementation forms, which is configured to pre-compensate group velocity dispersion (GVD) of the modulated light signal on the basis of the first digital signal using the digital filter arrangement (DFA) according to the first aspect or any of its implementation forms. Alternatively or additionally, the receiver is a receiver according to the third aspect or any of its implementation forms, which is configured to compensate GVD of the received modulated light signal on the basis of the second digital signal using the DFA according to the first aspect or any of its implementation forms.

The one or more optical fibers may correspond to one or more single mode fibers.

In an implementation form of the fourth aspect, the receiver may be a coherent-detection receiver. In particular, the receiver may be a coherent-detection receiver, in case of group velocity dispersion (GVD) post-compensation, that is in case of no pre-compensation by the transmitter but compensation by the receiver.

In an implementation form of the fourth aspect, the receiver may be a coherent-detection receiver or a direct detection receiver, in case of GVD pre-compensation by the transmitter.

The OTS of the fourth aspect and its implementation forms and optional features achieve the same advantages as the DFA of the first aspect and its respective implementation forms and respective optional features.

In order to achieve the OTS of the fourth aspect of the present disclosure, some or all of the implementation forms and optional features of the fourth aspect, as described above, may be combined with each other.

A fifth aspect of the present disclosure provides a method for compensating group velocity dispersion (GVD) of an optical transmission system (OTS) using a digital filter arrangement (DFA) according to the first aspect or any of its implementation forms, wherein the method comprises the step of receiving a sequence of samples of a digital input signal in the time domain in the form of consecutive blocks of size L, wherein each block comprises L consecutive samples of the digital input signal. The method further comprises the step of generating M discrete Fourier transforms of a current overlap block of a size N greater than the size L and of M−1 delayed versions of the current overlap block by using M discrete Fourier transform (DFT) filters. Each generated discrete Fourier transform is of the size N and comprises N entries. The current overlap block comprises the samples of a current block and the N−L last consecutive samples of a directly previous block that was received by the DFA directly before the current block. Each DFT filter of the M DFT filters is implemented by a DFT algorithm, in particular by a fast Fourier transform (FFT) algorithm, of a size Γ smaller than the size N and by an interpolation algorithm. The method further comprises the step of filtering, by a compensation filter, the entries of the generated M discrete Fourier transforms to generate an output discrete Fourier transform with N entries, wherein the compensation filter is implemented by a delay network and a linear combination algorithm.

In an implementation form of the fifth aspect, the method comprises the step of generating, on the basis of the output discrete Fourier transform, an output block of size N by using an inverse discrete Fourier transformation (IDFT) filter.

In an implementation form of the fifth aspect, the method comprises the step of generating an output block of the size L on the basis of the output block of the size N, by using an overlap-add or an overlap-save method.

In an implementation form of the fifth aspect, the method comprises the steps of generating, on the basis of the current block, the current overlap block of the size N greater than the size L, generating the M−1 delayed versions of the current overlap block, and jointly approximating, on the basis of the current overlap block and the M−1 delayed versions of the current overlap block, the M discrete Fourier transforms by using the M DFT filters.

In an implementation form of the fifth aspect, the method comprises the step of generating the M−1 delayed versions of the current overlap block by progressively delaying the current overlap block in steps of Δ samples.

In an implementation form of the fifth aspect, the method comprises the step of splitting the current block into M subblocks each of a size Δ, wherein each subblock comprises Δ consecutive samples of the current block, and the step of zero-padding each subblock to a zero-padded sequence of the size Γ comprising F samples, wherein each zero-padded sequence comprises the Δ samples of the corresponding subblock and Γ-Δ zeros. Further, the method may comprise the step of jointly approximating, on the basis of the M zero-padded sequences, M further discrete Fourier transforms by using the M DFT filters. Furthermore, the method may comprise the step of generating the M discrete Fourier transforms by delaying the M further discrete Fourier transforms, and by aligning and adding one or more of the M delayed further discrete Fourier transforms and one or more of the M further discrete Fourier transforms.

In an implementation form of the fifth aspect, the method comprises the step of performing the alignment by performing a symbol-wise multiplication of one or more delayed further discrete Fourier transforms and/or one or more further discrete Fourier transforms by a rotation vector.

In an implementation form of the fifth aspect, the method comprises the step of grouping the Δ samples of each subblock into two parts of samples, optionally into two equal parts of samples, the step of carrying out the zero-padding of each subblock to a zero-padded sequence of the size Γ by adding Γ-Δ zeros between the two parts of samples, and the step of jointly approximating, on the basis of the M zero-padded sequences, the M further discrete Fourier transforms by using the M DFT filters, wherein each DFT filter is implemented by a FFT algorithm of the size Γ and an interpolation algorithm.

In an implementation form of the fifth aspect, the method comprises the step of jointly approximating on the basis of the M zero-padded sequences the M further discrete Fourier transforms by transforming each zero-padded sequence by an FFT algorithm of the size F to a discrete Fourier transform of the size F, interpolating the Γ samples of each discrete Fourier transform of the size Γ to N samples of another discrete Fourier transform of the size N by a low-pass filter, and performing a symbol-wise multiplication of the samples of each other discrete Fourier transform by a rotation vector to obtain the respective further discrete Fourier transform.

In an implementation form of the fifth aspect, the compensation filter comprises N subfilters, wherein each subfilter is implemented by a delay network and a linear combination algorithm, and the method comprises the step of performing a filtering on the $k^{th}$ entry of one or more of the generated M discrete Fourier transforms by using the $k^{th}$ subfilter to generate the $k^{th}$ entry of the output Fourier transform, wherein each discrete Fourier transform comprises N entries. (k is an integer between 1 and N, k=1, . . . , N)

In an implementation form of the fifth aspect, the method comprises the step of generating, by the compensation filter, in particular by the $k^{th}$ subfilter, the $k^{th}$ entry of the output Fourier transform as a linear combination of the $k^{th}$ entry of one or more first discrete Fourier transforms of the M discrete Fourier transforms, and/or the $k^{th}$ entry of one or more delayed versions of one or more second discrete Fourier transforms of the M discrete Fourier transforms.

In an implementation form of the fifth aspect, the method comprises the step of performing, by the compensation filter, in particular by the $k^{th}$ subfilter, the linear combination by weighting the $k^{th}$ entry of the one or more first discrete Fourier transforms, and/or the $k^{th}$ entry of the one or more delayed versions of the one or more second discrete Fourier transforms with a respective coefficient.

In an implementation form of the fifth aspect, the method comprises the step of generating, by the compensation filter, in particular by the $k^{th}$ subfilter, the $k^{th}$ entry of each of the one or more delayed versions of each of the one or more second discrete Fourier transforms by delaying the $k^{th}$ entry of the respective second discrete Fourier transform using one or more integer delays.

In an implementation form of the fifth aspect, the method comprises the step of optimizing, by an optimization method, the one or more coefficients and/or the one or more integer delays with regard to the GVD compensation.

The method of the fifth aspect and its implementation forms and optional features achieve the same advantages as the DFA of the first aspect and its respective implementation forms and respective optional features.

The implementation forms and optional features of the DFA according to the first aspect are correspondingly valid for the method according to the fifth aspect.

In order to achieve the method according to the fifth aspect of the present disclosure, some or all of the implementation forms and optional features of the fifth aspect, as described above, may be combined with each other.

A sixth aspect of the present disclosure provides a computer program comprising program code for performing when implemented on a processor, a method according to the fifth aspect or any of its implementation forms.

A seventh aspect of the present disclosure provides a computer program comprising a program code for performing the method according to the fifth aspect or any of its implementation forms.

An eighth aspect of the present disclosure provides a computer comprising a memory and a processor, which are configured to store and execute program code to perform the method according to the fifth aspect or any of its implementation forms.

A ninth aspect of the present disclosure provides a non-transitory storage medium storing executable program code which, when executed by a processor, causes the method according to the fifth aspect or any of its implementation forms to be performed.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms will be explained in the following description of specific embodiments in relation to the enclosed drawings, in which:

FIG. 8 shows an optical transmission system (OTS) according to an embodiment.

DETAILED DESCRIPTION OF ILLUSTRATIVE EMBODIMENTS

Figure 1:
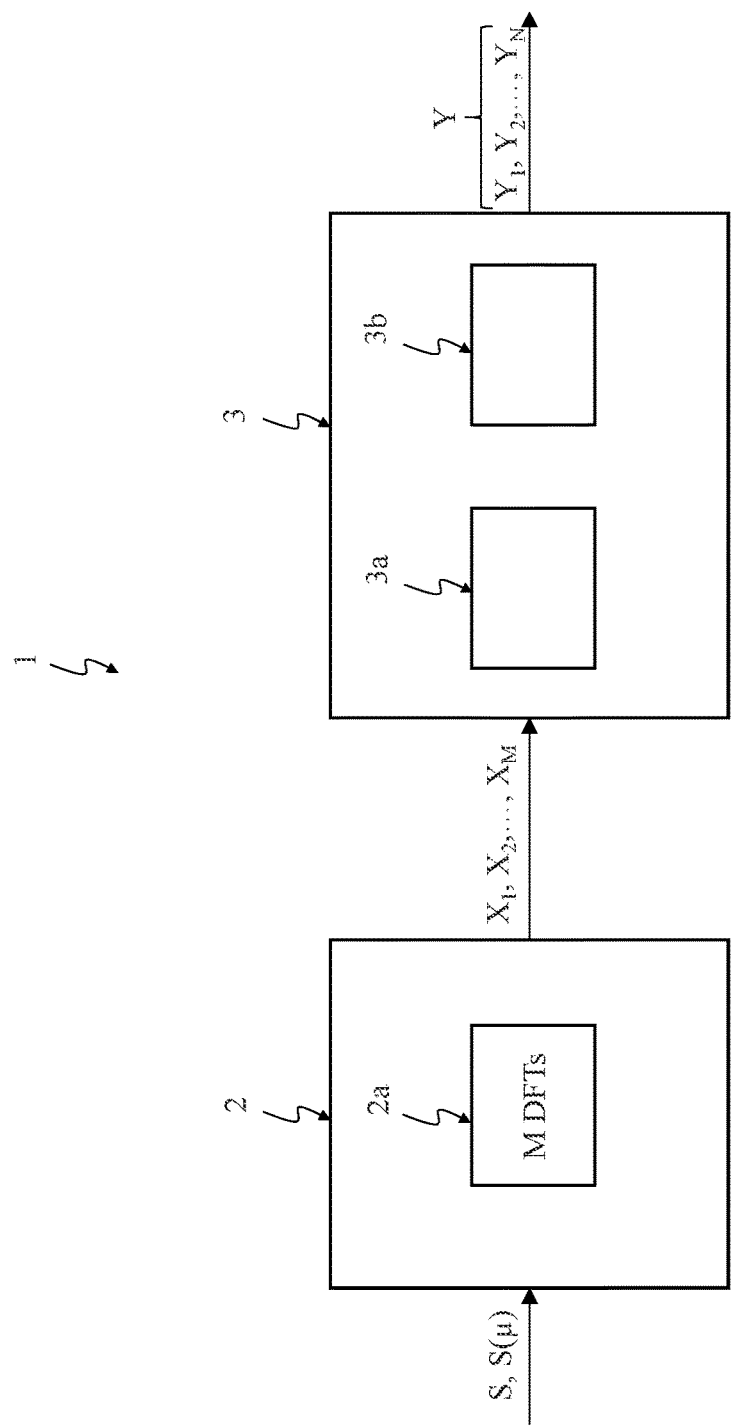
FIG. 1 shows a digital filter arrangement (DFA) according to an embodiment.

FIG. 1 shows a digital filter arrangement (DFA) according to an embodiment of the present disclosure.

The above description of the DFA according to the first aspect and its implementation forms is correspondingly valid for the DFA of FIG. 1.

The DFA 1 of FIG. 1 comprises two parts 2, 3. The first part 2 of the DFA 1 is configured for transforming samples of a sequence of samples of a digital input signal in the time domain from the time domain to the frequency domain. The second part 3 of the DFA 1 is configured to perform a filtering in the frequency domain of the transformed samples for compensating group velocity dispersion (GVD).

The first part 2 of the DFA 1 comprises M discrete Fourier transform (DFT) filters 2a. The first part 2 of the DFA may be configured to receive the sequence of samples of the digital input signal in the time domain in the form of consecutive blocks S respectively S(μ) of size L, wherein each block comprises L consecutive samples of the digital input signal. The "μ" corresponds to a time point, such as the time point of the clock of a processor for executing the function of the DFA 1.

The first part 2 of the DFA 1 may be configured to generate M discrete Fourier transforms $X_1, X_2, \ldots, X_M$ of a current overlap block of a size N greater than the size L and of M−1 delayed versions of the current overlap block by using the M DFT filters 2a. In other words, the first part 2 of the DFA may be configured to perform for a current block a transformation from the time domain to the frequency domain using the M DFT filters 2a generating M discrete Fourier transforms $X_1, X_2, \ldots, X_M$ for a current overlap block of a size N greater than the size L and M−1 delayed versions of the current overlap block, wherein the current overlap block is based on the current block. The M discrete Fourier transforms $X_1, X_2, \ldots, X_M$ are the results of the transformation from the time domain to the frequency domain.

Each DFT filter of the M DFT filters 2a is implemented by a DFT algorithm of a size F smaller than the size N and by an interpolation algorithm. The DFT algorithm of the size Γ may be a fast Fourier transform (FFT) algorithm of the size N.

The size L of each block S respectively S(μ) is the product of M and Δ (L=M·Δ), wherein M and Δ are each a positive integer. The size N of the current overlap block is the product of Δ with the sum of M and m (N=Δ·(M+m)), wherein m is a positive integer and the product of Δ and m (Δ·m) corresponds to the number of last consecutive samples in the sequence of samples of the directly previous block.

Each generated discrete Fourier transform of the M discrete Fourier transforms $X_1, X_2, \ldots, X_M$ is of the size N and comprises N entries. The entries may also be referred to as Fourier coefficients or Fourier components. The current overlap block comprises the samples of the current block and the N−L last consecutive samples of a directly previous block that was received by the first part 2 of the DFA 1 directly before the current block.

The second part 3 of the DFA 1 corresponds to a compensation filter. The compensation filter 3 is configured to filter the entries of the generated M discrete Fourier transforms $X_1, X_2, \ldots, X_M$ to generate an output discrete Fourier transform Y with N entries $Y_1, Y_2, \ldots, Y_N$. The output discrete Fourier transform Y is compensated with respect to the GVD. The compensation filter 3 is implemented by a delay network 3a and a linear combination algorithm 3b.

As a result of the frequency domain filtering using the compensation filter 3 the complexity of the DFA 1 is reduced, because a frequency domain implementation of filtering comprises a lower complexity compared to time domain implementations. Namely, in contrast to a time domain implementation of filtering, in a frequency domain implementation of filtering the number of operations per sample grows logarithmically instead of linearly with the filter size. In addition, as a result of using the DFT filters 2a the complexity of the DFA is further reduced. That is, the transformation of the samples from the time domain to the frequency domain using the DFT filters 2a requires a lower complexity compared to performing a normal DFT algorithm. Namely, for transforming a sequence of N samples from the time domain to the frequency domain a DFT algorithm of size N and, thus, a DFT filter of size N is normally required. In contrast thereto, the present disclosure proposes to use the M DFT filters 2a, wherein each DFT filter 2a is implemented by a DFT algorithm of a size Γ smaller than the size N and by an interpolation algorithm. That is, the present disclosure proposes to reduce the size of the DFT algorithm from N to F and to compensate this reduction by additionally performing an interpolation algorithm.

As outlined already above, the DFA 1 may be used in a receiver and/or a transmitter of an optical transmission system. Thus, the sequence of input blocks S may correspond to the complex baseband signal that shall be pre-compensated at the transmitter or post-compensated at the receiver in case of using one or more single-mode fibers for communication in an optical transmission system, in which the transmitter respectively receiver is provided. Since, as discussed above, GVD compensation may be applied separately to orthogonal polarizations, only one polarization is considered. The filtering using the DFA 1 for GVD compensation may also be applied to the second polarization, if necessary.

The DFA 1 may be implemented by hardware and/or software.

The DFA 1 according to FIG. 1 allows the use of any number of DFT filters 2a and the implementation of any overlap ratio, wherein the overlap ratio is defined as $$\frac{m}{(M+m)}$$

(M and m are each a positive integer). This is advantageous, because arbitrarily chosen low overlap ratios are possible by increasing the number M of DFT filters 2a. Due to the efficient joint approximation (joint computation) of the M discrete Fourier transforms $X_1, X_2, \ldots, X_M$ using the M DFT filters 2a, this results in complexity savings. The size N of the used M discrete Fourier transforms $X_1, X_2, \ldots, X_M$ may be reduced by increasing their number M. Due to the efficient joint computation of the M discrete Fourier transforms $X_1, X_2, \ldots, X_M$ using the M DFT filters 2a, this results in complexity savings at equal or better group velocity dispersion (GVD) tolerance.

According to an implementation form, the M DFT filters 2a and, thus, the M discrete Fourier transforms $X_1, X_2, \ldots, X_M$ may be progressively activated on demand according to the requested GVD tolerance in order to save complexity and power consumption over shorter links.

Figure 2:
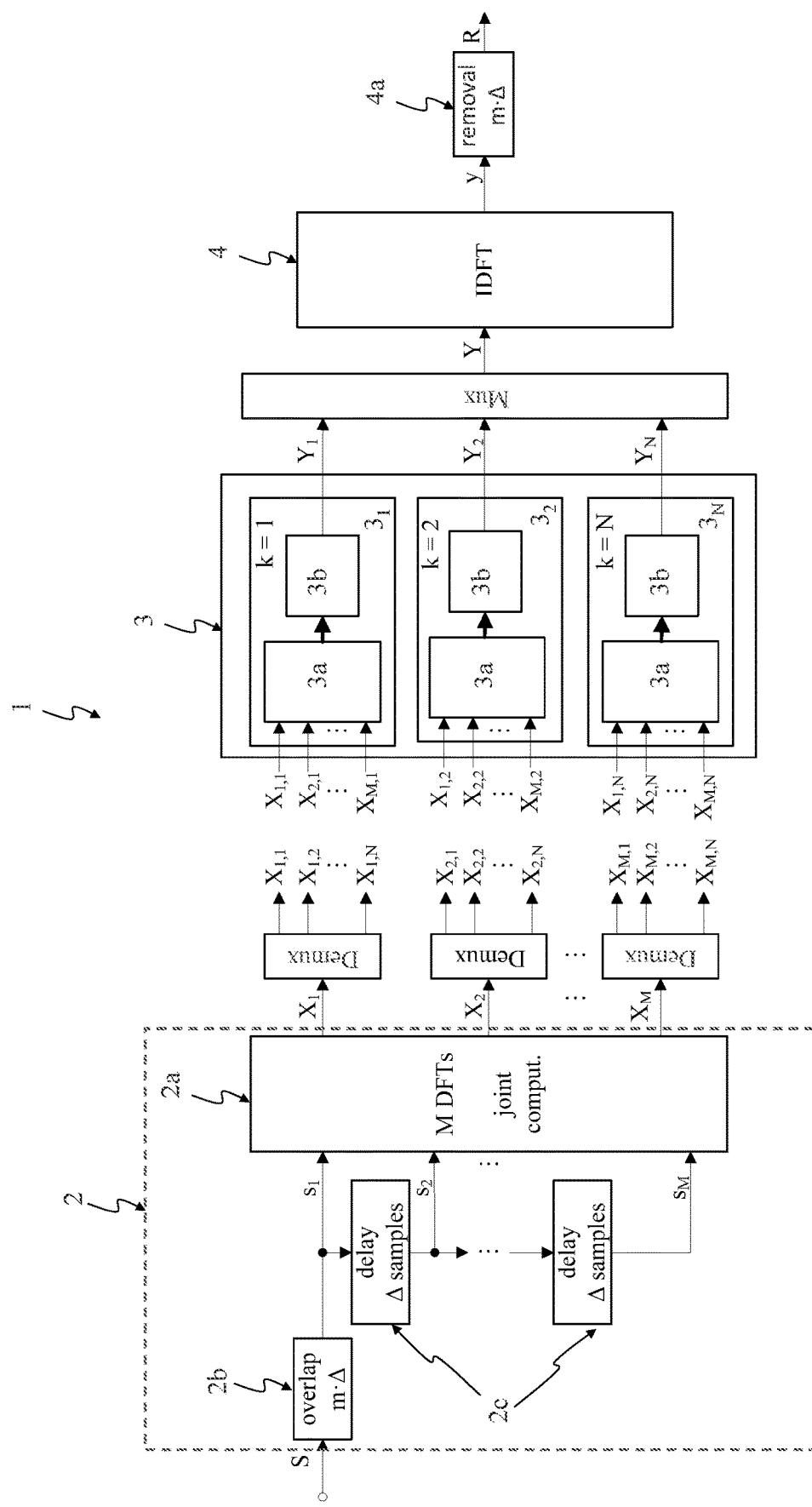
FIG. 2 shows a digital filter arrangement (DFA) according to an embodiment.

FIG. 2 shows a digital filter arrangement (DFA) according to an embodiment of the present disclosure.

The above description of the DFA according to the first aspect and its implementation forms is correspondingly valid for the DFA of FIG. 2.

The DFA 1 of FIG. 2 corresponds to the DFA 1 of FIG. 1, wherein FIG. 2 shows an implementation form of the first part 2 and the compensation filter 3 (second part) of the DFA 1 as well as optional additional features of the DFA 1 not shown in FIG. 1. The above description of the DFA 1 of FIG. 1 is also valid for the DFA 1 according to FIG. 2.

As shown in FIG. 2 the second part 2 of the DFA 1 comprises, besides the M DFTs 2a, an overlap unit 2b and M−1 delay units 2c. The overlap unit 2b is configured to generate in the time domain on the basis of a current block S a current overlap block $s_1$. The M−1 delay units 2c are configured to generate in the time domain on the basis of the current overlap block $s_1$ M−1 delayed versions $s_2, \ldots, s_M$ of the current overlap block $s_1$. As described already above with respect to FIG. 1, the current overlap block $s_1$ comprises the samples of the current block S and the N−L last consecutive samples of a directly previous block that was received by the DFA 1 directly before the current block S. The M−1 delayed versions $s_2, \ldots, s_M$ are differently delayed versions of the current overlap block $s_1$. Each delay unit 2c may be configured to delay the respective input by a multiple of Δ samples. During each clock the DFA 1 may receive a new block.

Therefore, as shown in FIG. 2 the DFA 1 is configured to generate, on the basis of the current block S, the current overlap block $s_1$ of the size N greater than the size L and to generate the M−1 delayed versions $s_2, \ldots, s_M$ of the current overlap block $s_1$. The DFA 1 is further configured to jointly compute on the basis of the current overlap block $s_1$ and the M−1 delayed versions $s_2, \ldots, s_M$ of the current overlap block $s_1$ the M discrete Fourier transforms $X_1, X_2, \ldots, X_M$ by using the M DFT filters 2a. In other words, the DFA 1 is configured to generate, by using the M DFT filters 2a, the M discrete Fourier transforms $X_1, X_2, \ldots, X_M$ on the basis of the current overlap block $s_1$ and the M−1 delayed versions $s_2, \ldots, s_M$ of the current overlap block $s_1$. Each discrete Fourier transform $X_1, X_2, \ldots, X_M$ is of the size N and comprises N entries. For example, the discrete Fourier transform $X_1$ comprises the N entries $X_{1,1}, X_{1,2}, \ldots, X_{1,N}$; the discrete Fourier transform $X_2$ comprises the N entries $X_{2,1}, X_{2,2}, \ldots, X_{2,N}$ and the discrete Fourier transform $X_M$ comprises the N entries $X_{M,1}, X_{M,2}, \ldots, X_{M,N}$.

According to the embodiment of FIG. 2, the DFA 1 is configured to generate in the time domain the current overlap block $s_1$ on the basis of the current block S and the M−1 delayed versions $s_2, \ldots, s_M$ of the current overlap block $s_1$.

As shown in FIG. 2, the DFA 1 may be configured to generate the M−1 delayed versions $s_2, \ldots, s_M$ of the current overlap block $s_1$ by progressively delaying the current overlap block $s_1$ in steps of Δ samples.

Further, as shown in FIG. 2, the compensation filter 3 (second part) of the DFA 1 comprises N subfilters $3_1, 3_2, \ldots, 3_N$ (a subfilter may also be referred to by only the term "filter"). Each subfilter comprises a delay network 3a and a linear combination algorithm 3b. The $k^{th}$ subfilter $3_k$ (k=1, 2, . . . , N) of the compensation filter 3 is configured to perform a filtering on the $k^{th}$ entry of one or more of the generated M discrete Fourier transforms $X_1, X_2, \ldots, X_M$ to generate the $k^{th}$ entry $Y_k$ of the output Fourier transform Y. In other words, the DFA 1 is configured to perform a filtering on the $k^{th}$ entry of one or more of the generate M discrete Fourier transforms $X_1, X_2, \ldots, X_M$ by using the $k^{th}$ subfilter $3_k$ to generate the $k^{th}$ entry $Y_k$ of the output Fourier transform Y.

The description with respect to a $k^{th}$ subfilter $3_k$ of the compensation filter 3 is valid for each subfilter of the N subfilters $3_1, 3_2, \ldots, 3_N$ of the compensation filter 3.

According to FIG. 2, the $k^{th}$ entries $X_{1,k}, X_{2,k}, \ldots, X_{M,k}$ of the M discrete Fourier transforms $X_1, X_2, \ldots, X_M$ are supplied to the $k^{th}$ subfilter $3_k$ of the compensation filter 3 (k=1, 2, . . . , N). Nevertheless, for compensating the GVD by the compensation filter 3, each subfilter $3_1, 3_2, \ldots, 3_N$ of the compensation filter 3 does not need to perform a filtering on all $k^{th}$ entries $X_{1,k}, X_{2,k}, \ldots, X_{M,k}$ of the M discrete Fourier transforms $X_1, X_2, \ldots, X_M$. That is, each subfilter $3_1, 3_2, \ldots, 3_N$ is configured to perform a filtering on the $k^{th}$ entry of one or more discrete Fourier transforms of the M discrete Fourier transforms $X_1, X_2, \ldots, X_M$. The subfilters $3_1, 3_2, \ldots, 3_N$ may be different with respect to the one or more respective entries of the one or more M discrete Fourier transforms $X_1, X_2, \ldots, X_M$ used for generating the respective entry $Y_1, Y_2, \ldots, Y_N$ of the output Fourier transform Y.

As shown in FIG. 2, the $k^{th}$ entries $X_{1,k}, X_{2,k}, \ldots, X_{M,k}$ of the M discrete Fourier transforms $X_1, X_2, \ldots, X_M$ are supplied to the delay network 3a of the $k^{th}$ subfilter. The delay network 3a of the $k^{th}$ subfilter $3_k$ is configured to generate the $k^{th}$ entry of one or more delayed versions of one or more discrete Fourier transforms (may be referred to as "one or more second discrete Fourier transforms") of the M discrete Fourier transforms $X_1, X_2, \ldots, X_M$ by delaying the $k^{th}$ entry of the respective discrete Fourier transform (second discrete Fourier transform) using one or more integer delays. The delay network 3a of the $k^{th}$ subfilter may be configured to generate the $k^{th}$ entry of the one or more delayed versions of the one or more discrete Fourier transforms by progressively delaying the $k^{th}$ entry of the respective discrete Fourier transform.

The one or more delayed versions of a discrete Fourier transform may differ to each other by a delay of multiples of L samples in the time domain or a delay of multiples of blocks of the respective discrete Fourier transform in the frequency domain. That is, a delayed version of a discrete Fourier transform may correspond to the discrete Fourier transform delayed by a delay of multiples of blocks of the discrete Fourier transform in the frequency domain.

The $k^{th}$ subfilter $3_k$ is configured to generate, using the respective linear combination algorithm 3b, the $k^{th}$ entry of the output Fourier transform as a linear combination of the $k^{th}$ entry of one or more discrete Fourier transforms (may be referred to as "one or more first discrete Fourier transforms") of the M discrete Fourier transforms $X_1, X_2, \ldots, X_M$ and/or the $k^{th}$ entry of one or more delayed versions of one or more discrete Fourier transforms (may be referred to as "one or more second discrete Fourier transforms") of the M discrete Fourier transforms $X_1, X_2, \ldots, X_M$. The $k^{th}$ entry of the one or more delayed versions of the one or more second discrete Fourier transforms is generated by the respective delay network 3a of the $k^{th}$ subfilter 3k, as shown in FIG. 2 by the arrow between the box "3a" indicating the delay network and the box "3b" indicating the linear combination algorithm of each subfilter.

Some or all of the one or more first discrete Fourier transforms and of the one or more second discrete Fourier transforms may correspond to each other.

The $k^{th}$ subfilter may be configured to perform the linear combination by weighting the $k^{th}$ entry of the one or more first discrete Fourier transforms, and/or the $k^{th}$ entry of the one or more delayed versions of the one or more second discrete Fourier transforms with a respective coefficient.

The $k^{th}$ subfilter may be configured to linearly combine the $k^{th}$ entry of the one or more first discrete Fourier transforms and/or the $k^{th}$ entry of the one or more delayed versions of the one or more discrete Fourier transforms by using one or more corresponding coefficients of the linear combination algorithm.

As shown in FIG. 2, the DFA 1 may optionally be configured to generate, on the basis of the output discrete Fourier transform Y, an output block y of size N by using an inverse discrete Fourier transformation (IDFT) filter 4. Further, the DFA 1 may optionally be configured to generate an output block R of the size L on the basis of the output block y of the size N, by using an overlap removal unit 4a. The overlap removal unit 4a may generate the output block R of the size L on the basis of the output block y of the size N by using an overlap-add or an overlap-save method.

As described above, according to the embodiment of FIG. 2 the following steps may be performed for GVD compensation:

In a first step, each current block S of the size L (L=M·Δ) comprising L input samples may be extended to a corresponding current overlap block $s_1$ of size N (N=(M+m)·Δ) comprising N samples by using an overlap technique. The overlap technique may correspond to an overlap-add or an overlap-save technique. The terms "overlap block" and "extended input block" may be used as synonyms.

In a second step, M−1 delayed versions $s_2, \ldots, s_M$ of the respective current overlap block $s_1$ may be generated. Each copy $s_2, \ldots, s_M$ of the respective current overlap block $s_1$ is successively delayed by Δ samples.

In a third step, M discrete Fourier transforms $X_1, X_2, \ldots, X_M$ may be jointly computed, using the M DFT filters 2a, on the basis of the respective current overlap block $s_1$ and the M−1 delayed versions of the respective current overlap block $s_2, \ldots, s_M$.

In a fourth step, the $k^{th}$ entry $Y_k$ of the output discrete Fourier transform Y (k=1, ..., N) may be computed, using the compensation filter 3, as a linear combination of the $k^{th}$ entry of one or more suitable first discrete Fourier transforms of the M discrete Fourier transforms $X_1, X_2, \ldots, X_M$ and/or the $k^{th}$ entry of one or more suitably delayed versions of one or more suitable second discrete Fourier transforms of the M discrete Fourier transforms $X_1, X_2, \ldots, X_M$. The sets of first and second discrete Fourier transforms may optionally have non-empty intersection. That is, optionally, some or all of the one or more first discrete Fourier transforms and of the one or more second discrete Fourier transforms may correspond to each other.

In an optional fifth step, the output block y of size N may be computed, by using the IDFT filter 4, on the basis of the output discrete Fourier transform Y.

In an optional sixth step, m·Δ overlapping samples may be removed from the output block y to obtain the block R of the size L (L=M·Δ) comprising L output samples. The optional overlap removal unit 4a shown in FIG. 2 is configured to remove mΔ overlapping samples from the output block y to generate the block R of the size L. The samples of the block R are GVD compensated with respect to the samples of the corresponding current block S.

According to the embodiment of FIG. 2 the first step of overlapping and second step of delaying are performed in the time domain. According to another embodiment the first step of overlapping and second step of delaying may also be performed in the frequency domain, as exemplarily described below with respect to FIG. 6 in case M equals three (M=3), L equals three samples (L=3) and N equals four samples (N=4).

$$Y_k[\mu] = \Sigma_{i=0}^{l-1} c_{k,i} \cdot \text{DFT}_k(D^{(i+P_k) \cdot \Delta}(\hat{S}[\mu]))$$

In the following an implementation form of the above described fourth step that may be performed by an embodiment of the DFA 1 is described. The $k^{th}$ entry $Y_k[\mu]$ (for k=1, ..., N) of the N entries of the output discrete Fourier transform Y may be computed as the following linear combination $$Y_k[\mu] = \Sigma_{i=0}^{l-1} c_{k,i} \cdot \text{DFT}_k(D^{(i+P_k) \cdot \Delta}(\hat{S}[\mu])). \quad (1)$$

The $k^{th}$ entry may also be referred to as the $k^{th}$ discrete Fourier transform (DFT) component (in short: $k^{th}$ Fourier component) or as the $k^{th}$ Fourier coefficient.

In the above equation (1), $D^n$ represents a delay of n samples, $\text{DFT}_k$ is a $k^{th}$ Fourier coefficient ($k^{th}$ entry) of a discrete Fourier transform, $\hat{S}[\mu]$ denotes the $\mu^{th}$ overlap block ($\mu^{th}$ block (input block) of the size L (L=M·Δ) extended by an overlap section of the size m·Δ), l is the number of coefficients in the linear combination, $c_{k,i}$ is a coefficient of the linear combination (which may be optimized as described below), and $p_k$ is an integer number (which may be optimized as described below) corresponding to an integer delay of $p_k$ Δ samples. In particular, $c_{k,i}$ may be a coefficient of one or more coefficients of the linear combination algorithm 2c of the $k^{th}$ subfilter $3_k$ of the compensation filter 3 (as shown below in equation (3)). Further, $p_k$ may be an integer number corresponding to an integer delay of one or more integer delays of the delay network 2b of the $k^{th}$ subfilter 3k (as shown below in equations (2) and (3)).

The term "$D^{(i+p_k) \cdot \Delta}(\hat{S}[\mu])$", inside the round brackets of $\text{DFT}_k(\ldots)$ in the above equation (1), corresponds to the input in the time domain that is transformed by the respective DFT algorithm to the frequency domain. Thus, $\text{DFT}_k$ is the $k^{th}$ entry of the respective discrete Fourier transform that is generated by the DFT algorithm.

$$(i+p_k) \cdot \Delta = q_{k,i} \cdot L + r_{k,i} \in \{0,1,\ldots,M-1\} p_k M$$

The equality $$(i+p_k) \cdot \Delta = q_{k,i} \cdot L + r_{k,i} \Delta q_{k,i} r_{k,i} \in \{0,1,\ldots,M-1\} i + p_k M \quad (2)$$

$$(i+p_k) \Delta = q_{k,i} \cdot L + r_{k,i} \Delta q_{k,i} r_{k,i} \in \{0,1,\ldots,M-1\} i + p_k M$$

holds, wherein the integers and denote the quotient and the remainder of the integer division of by.

$$Y_k[\mu] = \Sigma_{i=1}^{l-1} c_{k,i} \cdot D^{q_{k,i} \cdot L}(\text{DFT}_k(D^{r_{k,i} \cdot \Delta}(\hat{S}[\mu]))) = \Sigma_{i=1}^{l-1} c_{k,i} \cdot D^{q_{k,i} \cdot L}(X_{(r_{k,i}+1),k}) r_{k,i} r_{k,i} = 0 X_{(r_{k,i}+1),k} X_{1,k} k=1,\ldots, N q_{k,i} L q_{k,i}$$

Thus, the equation (1) may be rewritten as $$Y_k[\mu] = \Sigma_{i=1}^{l-1} c_{k,i} \cdot D^{q_{k,i} \cdot L}(\text{DFT}_k(D^{r_{k,i} \cdot \Delta}(\hat{S}[\mu]))) = \Sigma_{i=1}^{l-1} c_{k,i} \cdot D^{q_{k,i} \cdot L}(X_{(r_{k,i}+1),k}) k=1,\ldots, N q_{k,i} L q_{k,i} X_{(r_{k,i}+1),k} r_{k,i} r_{k,i} = 0 X_{(r_{k,i}+1),k} X_{1,k}, \quad (3)$$

$$Y_k[\mu] = \Sigma_{i=1}^{l-1} c_{k,i} \cdot D^{q_{k,i} \cdot L}(\text{DFT}_k(D^{r_{k,i} \cdot \Delta}(\hat{S}[\mu]))) = \Sigma_{i=1}^{l-1} c_{k,i} \cdot D^{q_{k,i} \cdot L}(X_{(r_{k,i}+1),k}) k=1,\ldots, N q_{k,i} L q_{k,i} X_{(r_{k,i}+1),k} r_{k,i} r_{k,i} = 0 X_{(r_{k,i}+1),k} X_{1,k}$$

wherein. In the above equation (3), a delay of a multiple of samples is implemented as delay of blocks of the corresponding discrete Fourier transform. In case the remainder is zero ( ), then the $k^{th}$ entry shown in equation (3) corresponds to the $k^{th}$ entry of the discrete Fourier transform $X_1$ of the M discrete Fourier transforms $X_1, \ldots, X_M$.

The above equation (3) shows that the linear combination according to the above equation (1) is compatible with the block diagram of FIG. 2. The above equation (3) may describe, according to an embodiment of the DFA 1, the filtering of the $k^{th}$ entry $X_{(r_{k,i+1}),k}$ of a discrete Fourier transform $X_{(r_{k,i+1})}$ of the M discrete Fourier transforms $X_1, \ldots, X_M$ by using the $k^{th}$ subfilter $3_k$. For an embodiment of the DFA 1, the above equation (3) indicates for the $k^{th}$ subfilter the delaying by the respective delay network 3a (which is represented by $D^{q_{k,i} \cdot L}$ in the equation (3)) and the linear combination by the respective linear combination algorithm 3b (which is represented by $c_{k,i}$ in the equation (3)).

In the following an optional optimization process of the coefficients $c_{k,i}$ and integer delays $p_k$ for k=1, ..., N and i=0, 1, ..., l-1 is described, in case the DFA 1 uses an overlap technique, such as an overlap-discard or overlap-add method, for generating a current overlap block of a current block received by the DFA 1.

For such an optimization the constraint is posed that the phase response of the compensation filter 3 of the DFA 1 (which may also be referred to as equalizer filter) is the inverse of the GVD phase response, except for an immaterial frequency-independent phase rotation and delay. The optimization target is the minimization of the time-domain aliasing resulting from the overlap technique (e.g. overlap-discard or overlap-add method). In other terms, the target is to acquire an exact inversion of the GVD response in the frequency domain. Since the equivalent impulse response may exceed the overlap length ($\Delta \cdot$m), it is a target that a proper measure (described below) of the resulting time-domain aliasing is minimized.

$$\Sigma_{i=0}^{l-1} c_{k,i} \cdot \exp(-j \cdot 2\pi \cdot (i+p_k) \cdot \Delta \cdot f_k) = h_k (k=1, \ldots, N) h_k - 0.5 \leq f_k \leq 0.5$$

In mathematical terms the constraint may read $$\Sigma_{i=0}^{l-1} c_{k,i} \cdot \exp(-j \cdot 2\pi \cdot (i+p_k) \cdot \Delta \cdot f_k) = h_k (k=1, \ldots, N) h_k - 0.5 \leq f_k \leq 0.5, (4)$$

$$\Sigma_{i=0}^{l-1} c_{k,i} \cdot \exp(-j \cdot 2\pi \cdot (i+p_k) \cdot \Delta \cdot f_k) = h_k (k=1, \ldots, N) h_k - 0.5 \leq f_k \leq 0.5$$

wherein is the $k^{th}$ Fourier coefficient (entry) of a discrete Fourier transform of the inverse GVD phase response and is the normalized frequency associated with the $k^{th}$ Fourier coefficient.

$$(a+1)X_a Y_k[\mu] Z_{a,k}[\mu] Z_{a,k}[\mu] \triangleq \Sigma_{i=0}^{l-1} c_{k,i} \cdot \mathrm{DFT}_k((D^{r_{k,i} \cdot \Delta}(\hat{S}[\mu])) \cdot \delta((i+p_k) \bmod M, \alpha) \delta \bmod MM$$

The aliasing generated by the compensation filter 3 in turn when only one of the M discrete Fourier transforms is non-zero is considered. When the -th Fourier transform is the only non-zero transform of the M discrete Fourier transforms $X_1, \ldots, X_M$, it follows from equation (1) that is equal to below:

$$(a+1)X_a Y_k[\mu] Z_{a,k}[\mu] Z_{a,k}[\mu] \triangleq \Sigma_{i=0}^{l-1} c_{k,i} \cdot \mathrm{DFT}_k((D^{r_{k,i} \cdot \Delta}(\hat{S}[\mu])) \cdot \delta((i+p_k) \bmod M, \alpha) \delta \bmod MM, \quad (5)$$

$(a+1)X_a Y_k[\mu] Z_{a,k}[\mu] Z_{a,k}[\mu] \triangleq \Sigma_{i=0}^{l-1} c_{k,i} \cdot \mathrm{DFT}_k((D^{r_{k,i} \cdot \Delta}(\hat{S}[\mu])) \cdot \delta((i+p_k) \bmod M, \alpha) \delta \bmod MM$ wherein a=0, ..., M-1 and k=1, ..., N; is the Kronecker delta and denotes the reduction modulo.

$$\mathrm{DFT}_k(a+1) \mathrm{DFT}_k(D^{(i+p_k) \cdot \Delta}(\hat{S}[\mu])) = 1 k = 1, \ldots, N(a+1)$$
$$a=0,1, \ldots, M-1 \mu z_a = \mathrm{IDFT}([\Sigma_{i=0}^{l-1} c_{1,i} \cdot \delta((i+p_1) \bmod M, a), \ldots, \Sigma_{i=0}^{l-1} c_{N,i} \cdot \delta((i+p_N) \bmod M, a)]) z_a = 0,1, \ldots, M-1$$

In analogy with the case of the conventional impulse response, for the purpose of quantifying the time-domain aliasing, it is assumed that all Fourier coefficients of the -th discrete Fourier transform according to equation (5) are equal to one (for). The resulting -th time-domain response for is considered in the following equation (6), where the time index is dropped:

$$\mathrm{DFT}_k(a+1) \mathrm{DFT}_k(D^{(i+p_k) \cdot \Delta}(\hat{S}[\mu])) = 1 k = 1, \ldots, N(a+1)$$
$$a=0,1, \ldots, M-1 \mu z_a = \mathrm{IDFT}([\Sigma_{i=0}^{l-1} c_{1,i} \cdot \delta((i+p_1) \bmod M, a), \ldots, \Sigma_{i=0}^{l-1} c_{N,i} \cdot \delta((i+p_N) \bmod M, a)]) z_a = 0,1, \ldots, M-1. \quad (6)$$

$$\mathrm{DFT}_k(a+1) \mathrm{DFT}_k(D^{(i+p_k) \cdot \Delta}(\hat{S}[\mu])) = 1 k = 1, \ldots, N(a+1) a=0,1, \ldots, M-1 \mu z_a = \mathrm{IDFT}([\Sigma_{i=0}^{l-1} c_{1,i} \cdot \delta((i+p_1) \bmod M, a), \ldots, \Sigma_{i=0}^{l-1} c_{N,i} \cdot \delta((i+p_N) \bmod M, a)]) z_a = 0,1, \ldots, M-1$$

A suitable norm of the subsequence of 0 that lies outside of the overlap region is regarded as time-domain aliasing. Therefore, the target of the optimization problem is the minimization of this norm.

Several choices of the norm are possible. If the infinite norm or the $L_1$ distance ($L_1$ norm) are used, a mixed-integer linear programming problem is obtained. In case of the Euclidean norm, a least-square problem is obtained. Both types of problems may be solved by using standard numerical routines.

The solution of the optional optimization problem may be done by a usual optimization routine. The approach to define the optional optimization problem consists of two steps:

In a first step the response of the DFA 1 between the points after the overlap unit 2b and before the overlap removal unit 4a is constrained to be the inverse of the GVD function. In a second step the time-domain aliasing is minimized. The time-domain aliasing is defined using a proper norm of M equivalent impulse responses $z_a$ for a=0, 1, ..., M-1. The (a+1)-th equivalent impulse response is obtained when all the Fourier coefficients of the (a+1)-th Fourier transform $X_a$ of the M discrete Fourier transforms $X_1, \ldots, X_M$ are equal to 1 and all the Fourier coefficients of the remaining M-1 Fourier transforms $X_i$ (i ∈ {1, 2, ..., M}, i≠a+1) of the M discrete Fourier transforms $X_1, \ldots, X_M$ are equal to 0.

A DFA that is equivalent to the DFA of FIG. 2 may optionally be implemented with a single DFT filter and M IDFT filters according to the theory of signal flow graphs (SFGs). This implementation may be referred to as the transposed implementation. The transposed implementation allows the same overlap reduction (reduction of the overlap ratio) as the implementation of the DFA 1 shown in FIG. 2. However, the transposed implementation does not allow the joint IDFT computation and is therefore less computationally efficient.

Figure 3:
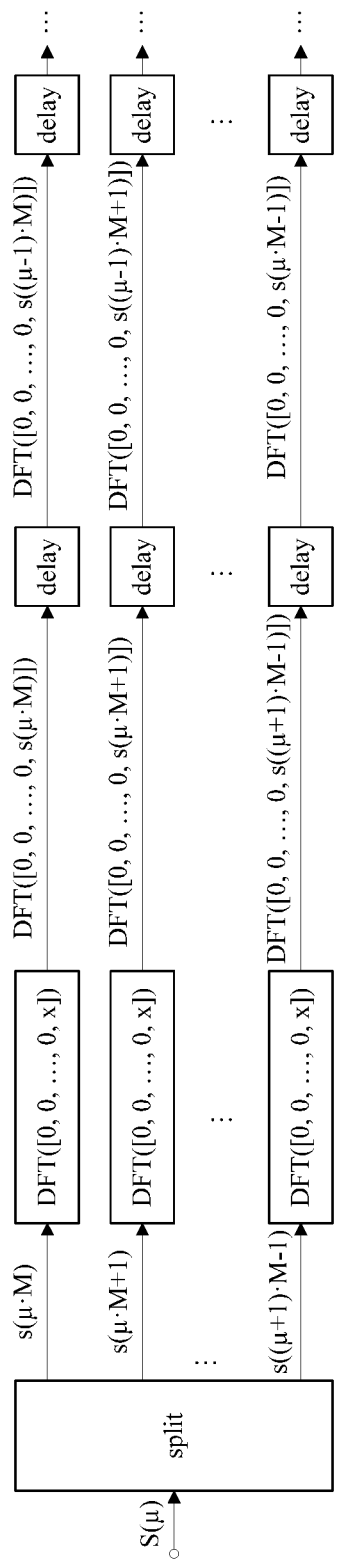
FIG. 3 shows an example of a transformation from the time domain to the frequency domain and a delaying in the frequency domain used in a digital filter arrangement (DFA) according to an embodiment.

FIG. 3 shows an example of a transformation from the time domain to the frequency domain and a delaying in the frequency domain used in a digital filter arrangement (DFA) according to an embodiment of the present disclosure.

According to FIG. 3 a current block S(μ) of size L (L=M·Δ) may be split in the time domain into M subblocks respectively sequences s(μ·M), s(μ·M+1), ..., s((μ+1)·M-1) of size Δ (M and Δ are positive integers), wherein "μ" corresponds to a time point, such as the time point of the clock of a processor for executing the function of the DFA. Thus, in case μ equals zero (μ=0) and M equals three (M=3), the current block S(0) may be split into the three consecutive subblocks s(0), s(1) and s(2). On the basis of each subblock corresponding M discrete Fourier transforms DFT([0, 0, ..., 0, s(μ·M)]), DFT([0, 0, ..., 0, s(μ·M+1)]) and DFT([0, 0, ..., 0, s((μ+1)·M-1)])(which may also be referred to as "M further discrete Fourier transforms" or "M input-pruned discrete Fourier transforms") are generated. The generation of these M further discrete Fourier transforms according to an embodiment of the present disclosure is described below with respect to FIG. 5.

Further, as shown in FIG. 3 one or more delayed versions of the M further discrete Fourier transforms may be generated in the frequency domain. For example, in case μ equals zero (μ=0) and M equals 3 (M=3), for the three subblocks s(0), s(1) and s(2) the three further discrete Fourier transforms DFT([0, 0, ..., 0, s(0)]), DFT([0, 0, ..., 0, s(1)]) and DFT([0, 0, ..., 0, s(2)]) may be generated. As shown in FIG.

3, for these three further discrete Fourier transforms DFT([0, 0, . . . , 0, s(0)]), DFT([0, 0, . . . , 0, s(1)]) and DFT([0, 0, . . . , 0, s(2)]) the delayed versions DFT([0, 0, . . . , 0, s(−3)]), DFT([0, 0, . . . , 0, s(−2)]) and DFT([0, 0, . . . , 0, s(−1)]) may be generated in the frequency domain. The three subblocks s(−3), s(−2) and s(−1) correspond to the three consecutive subblocks of the block S(−1), in case M equals three (M=3). The block S(−1) is the directly previous block to the block S(0) in the sequence of consecutive blocks that may be input to the digital filter arrangement of the first aspect or any of its implementation forms for inputting a sequence of samples of a digital input signal in the time domain. The subblock s(−3) of the block S(−1) corresponds to the subblock s(0) of the block S(0), the subblock s(−2) of the block S(−1) corresponds to the subblock s(1) of the block S(0) and the subblock s(−1) of the block S(−1) corresponds to the subblock s(2) of the block S(0). Thus, the delayed version DFT([0, 0, . . . , 0, s(−3)]) corresponds to the further discrete Fourier transform of the subblock s(−3), the delayed version DFT([0, 0, . . . , 0, s(−2)]) corresponds to the further discrete Fourier transform of the subblock s(−2) and the delayed version DFT([0, 0, . . . , 0, s(−1)]) corresponds to the further discrete Fourier transform of the subblock s(−1).

Figure 4:
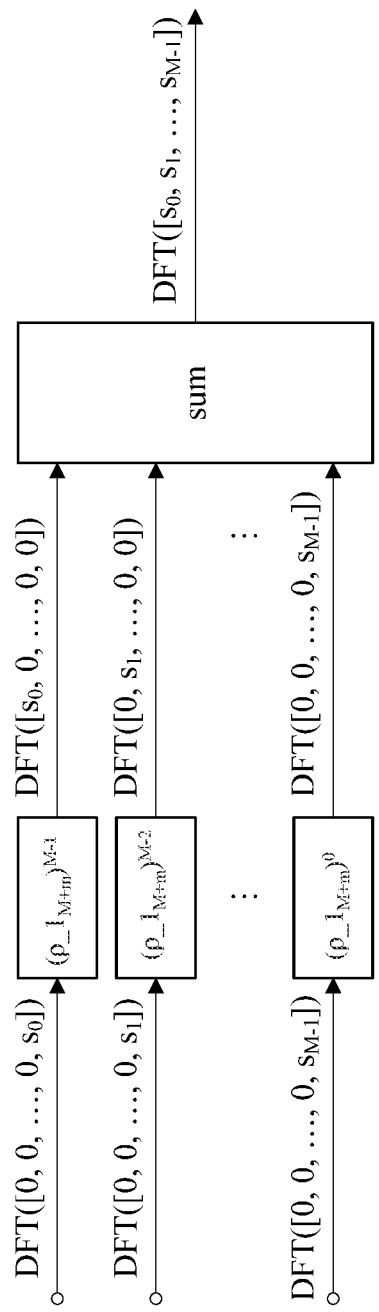
FIG. 4 shows an example of an aligning and adding of discrete Fourier transforms in the frequency domain.

FIG. 4 shows an example of an aligning and adding of discrete Fourier transforms in the frequency domain.

According to FIG. 4 an alignment and adding of discrete Fourier transforms in the frequency domain may be performed by a symbol-wise multiplication of the discrete Fourier transforms by a rotation vector $\rho_{M+m}$ whose elements are powers of the elements of a base rotation vector $\rho\_1_{M+m}$ and a subsequent addition of the results of the symbol-wise multiplications.

$$\rho\_1_{M+m}\rho\_1_{M+m} \triangleq \exp\left(j\frac{2\pi}{M+m}[0, 1, \ldots, N-1]\right)(\rho\_1_{M+m})^{M-1}$$

The base rotation vector may be as follows:

$$\rho\_1_{M+m}\rho\_1_{M+m} \triangleq \exp\left(j\frac{2\pi}{M+m}[0, 1, \ldots, N-1]\right)(\rho\_1_{M+m})^{M-1},$$

wherein j is the imaginary unit.

$$\rho\_1_{M+m}\rho\_1_{M+m} \triangleq \exp\left(j\frac{2\pi}{M+m}[0, 1, \ldots, N-1]\right)(\rho\_1_{M+m})^{M-1}$$

For example, as can be seen from FIG. 4, by performing the symbol-wise multiplication of the discrete Fourier transform DFT([0, 0, . . . , 0, $s_0$]) with an alignment may be performed. Namely, the samples of the block so in the sequence of [0, 0, . . . , 0, $s_0$] that is the input of the discrete Fourier transform DFT([0, 0, . . . , 0, $s_0$]) is shifted from the one end (right side) of the sequence to the other end (left side) of the sequence providing the sequence [$s_0$, 0, . . . , 0, 0] that is the input of the discrete transform DFT([$s_0$, 0, . . . , 0, 0]). This symbol-wise multiplication by a rotation vector corresponds to a shift in the time domain. As shown in FIG. 4, by aligning and adding the M discrete Fourier transforms DFT([0, 0, . . . , 0, $s_0$]), DFT([0, 0, . . . , 0, $s_1$]), . . . , DFT([0, 0, . . . , 0, $s_{M-1}$]) the discrete Fourier transform DFT([$s_0$, $s_1$, . . . , $s_{M-1}$]) may be generated in the frequency domain.

Figure 5:
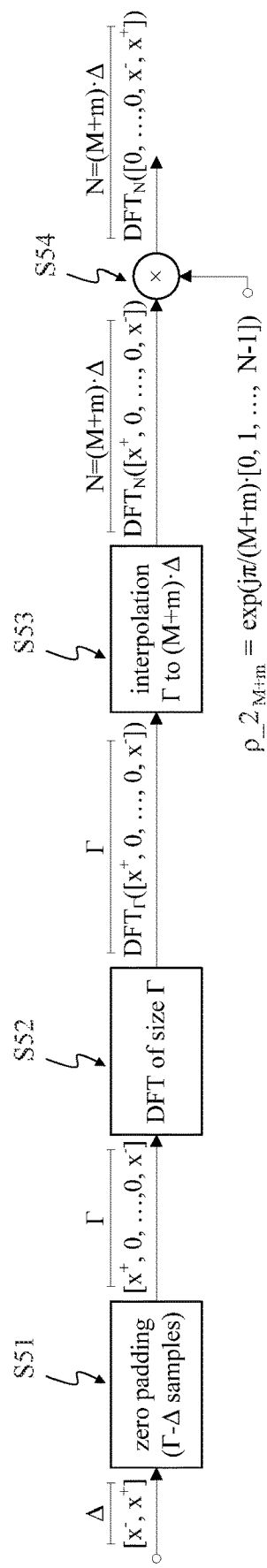
FIG. 5 shows the generation of the M further discrete Fourier transforms shown in FIGS. 3 and 6 by a digital filter arrangement (DFA) according to an embodiment.
Figure 6:
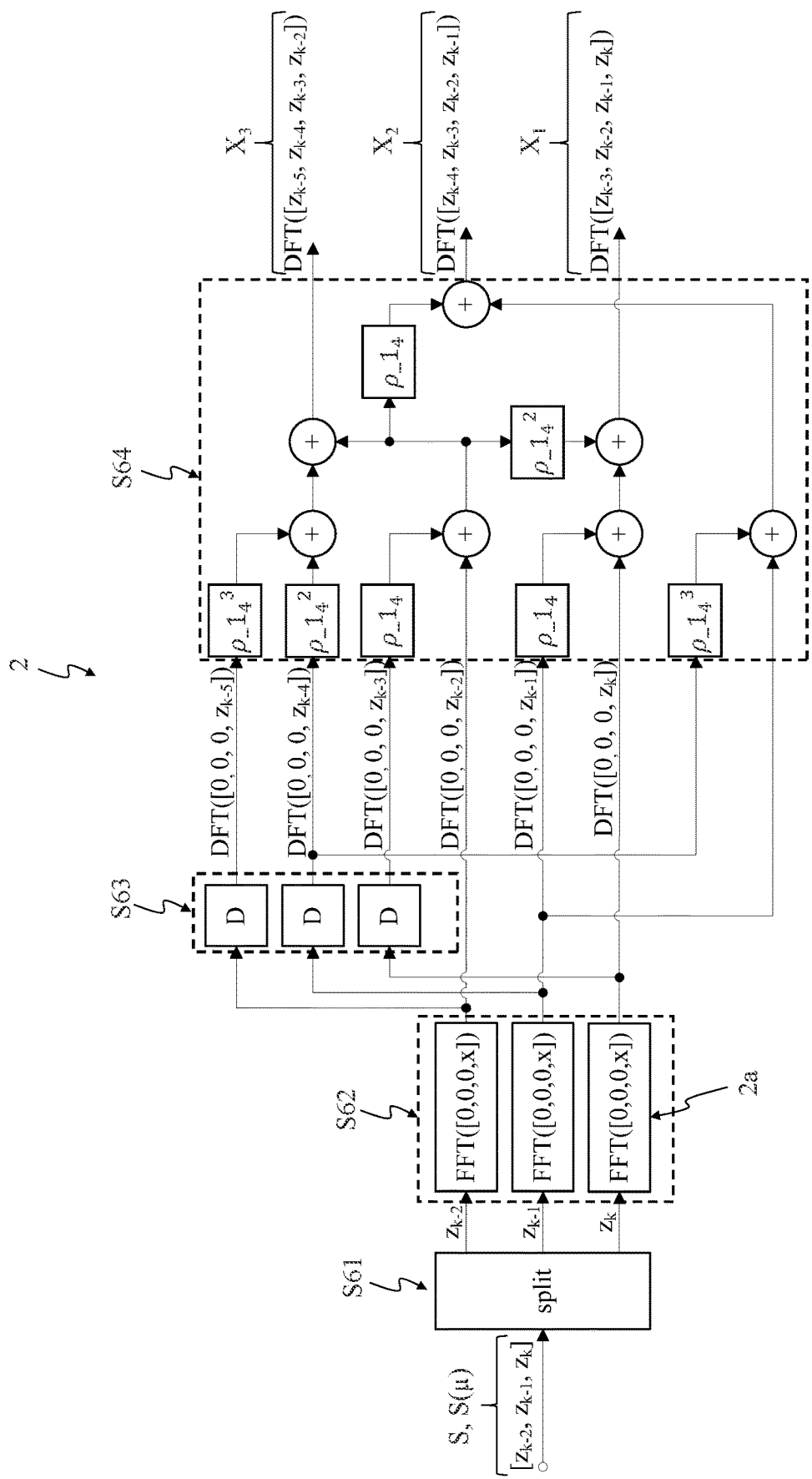
FIG. 6 shows a generation of M discrete Fourier transforms of a current overlap block of a size N greater than the size L and of M−1 delayed versions of the current overlap block by using M discrete Fourier transform (DFT) filters of a digital filter arrangement (DFA) according to an embodiment, wherein M equals three (M=3), L equals three times Δ samples (L=3·Δ), Δ is a generic positive integer number and N equals four times Δ samples (N=4·Δ)

FIG. 5 shows the generation of the M further discrete Fourier transforms shown in FIGS. 3 and 6 by a digital filter arrangement (DFA) according to an embodiment of the present disclosure.

The above description of the DFA according to the first aspect and its implementation forms is correspondingly valid for the DFA of FIG. 5.

According to an embodiment of the present disclosure, the generation of the M further discrete Fourier transforms (which may also be referred to as "input-pruned discrete Fourier transforms") shown in FIGS. 3 and 6 may comprise the following steps:

The DFA is configured to group the Δ samples of each subblock of the M subblocks into two parts of samples x− and x+. Optionally, the DFA may be configured to group the Δ samples of each subblock of the M subblocks into two equal parts of samples x− and x+. The M subblocks form a current block S of the size L (L=M·Δ) received by the DFA (not shown in FIG. 5).

In a second step S51 following the first step, the DFA is configured to carry out a zero-padding of each subblock to a zero-padded sequence of the size Γ (Γ>Δ) by adding Γ-Δ zeros between the two parts of samples x− and x+ (Γ is smaller than N). Γ may beneficially be a positive integer. As a result in the second step S51 starting with a subblock corresponding to the sequence of samples [x−, x+] the zero-padded sequence [x+, 0, . . . , 0, x−] is generated, wherein the zero-padded sequence [x+, 0, . . . , 0, x−] comprises the two parts of samples x− and x+ of the subblock and Γ-Δ zeros. The zero-padding introduces excess bandwidth and allows for interpolation, which is performed in the step S53. According to an embodiment, Γ may be assumed to be $$\frac{N}{3}\left(\Gamma = \frac{N}{3}\right).$$

As shown in FIG. 5, the DFA may be configured to group the Δ samples of each subblock into a first part x+ of samples (first part comprising consecutive coefficients) and a second part x− of samples (second part comprising consecutive coefficients). The number of samples of the first and second part may optionally be the same. The term "contiguous" may be used as a synonym for the term "consecutive".

The first and second part x+ and x− may be arranged in the respective subblock, such that in the sequence of consecutive samples of the respective subblock the samples of the second part x− are arranged previous to the samples of the first part x+. That is, the subblock may correspond to the sequence [x−, x+]. That is, the samples of the second part x− may be arranged at the beginning and the samples of the first part x+ may be arranged at the end of the respective subblock.

As shown in FIG. 5, the zero-padding in the second step S51 of each subblock generates a zero-padded sequence [x+, 0, . . . , 0, x−] of the size Γ by adding Γ-Δ zeros between the first part x+ of samples and the second part x− of samples of the respective subblock, wherein the positions of the first part x+ and second part x− are swapped (the sequence [x−, x+] is zero-padded to the sequence [x+, 0, . . . , 0, x−]). Thus, after zero-padding, the samples of the first part x+ may be arranged at the beginning of the zero-padded sequence and the samples of the second part x− may be arranged at the end of the zero-padded sequence, wherein the Γ-Δ zeros are arranged between these two parts. The zero-padding of each subblock may entail a reordering of the two parts of samples of the respective subblock.

In a third step S52 following the second step S51, the zero-padded sequence generated in the second step S51 is transformed by a DFT algorithm of the size Γ to a discrete Fourier transform $DFT_\Gamma([x+, 0, \ldots, 0, x-])$ of the size F. The DFT algorithm of the size Γ may be a fast Fourier transform (FFT) algorithm.

In a fourth step S53 following the second step S52, the DFA is configured to interpolate, using an interpolation algorithm, the Γ samples of the discrete Fourier transform $DFT_\Gamma([x+, 0, \ldots, 0, x-])$ of the size F, generated in the step S52, to N samples of another discrete Fourier transform $DFT_N([x+, 0, \ldots, 0, x-])$ of the size N (N=(M+m)·Δ). The discrete Fourier transform $DFT_\Gamma([x+, 0, \ldots, 0, x-])$ of the size Γ may be interpolated from Γ samples to N samples using a low-pass real filter.

In a fifth step S54 following the fourth step S53, the DFA is configured to perform a symbol-wise multiplication of the samples of the other discrete Fourier transform $DFT_N([x+, 0, \ldots, 0, x-])$ by a rotation vector $\rho\_2_{M+m}$ to obtain the respective further Fourier transform $DFT_N([0, \ldots, 0, x-, x+,])$ of the size N.

The symbol-wise multiplication of the samples of each other discrete Fourier transform by the rotation vector in step S54 corresponds to a shift in the time domain of the non-zero samples of the respective zero-padded sequence. Therefore, as shown in FIG. 5, the first and second part x+ and x− are arranged together at the end of the sequence $[0, \ldots, 0, x-, x+]$ to which the further discrete Fourier transform $DFT_N([0, \ldots, 0, x-, x+,])$ corresponds to, wherein the samples of the second part x− are arranged previous to the samples of the first part x+.

$$\rho\_2_{M+m}\rho\_2_{M+m} \triangleq \exp\left(j\frac{\pi}{M+m}[0, 1, \ldots, N-1]\right)$$

The rotation vector may be as follows:

$$\rho\_2_{M+m}\rho\_2_{M+m} \triangleq \exp\left(j\frac{\pi}{M+m}[0, 1, \ldots, N-1]\right),$$

wherein j is the imaginary unit.

The interpolation may be implemented by using a polyphase finite impulse response (FIR) filter, wherein the input of the polyphase FIR filter is regarded as periodic.

The DFT algorithm of the above described third step S52 and the interpolation algorithm of the above described fourth step S53 implement a DFT filter of the M DFT filters used by the DFA for generating the M further discrete Fourier transforms. As shown with respect to FIG. 6, on the basis of the M further discrete Fourier transforms the M discrete Fourier transforms, whose entries are provided to the compensation filter of the DFA, may be generated. In particular, the DFA may be configured to generate the M discrete Fourier transforms by delaying the M further discrete Fourier transforms and by aligning and adding one or more of the M delayed further Fourier transforms and one or more of the M further discrete Fourier transforms.

FIG. 6 shows a generation of M discrete Fourier transforms of a current overlap block of a size N greater than the size L and of M−1 delayed versions of the current overlap block by using M discrete Fourier transform (DFT) filters of a digital filter arrangement (DFA) according to an embodiment of the present disclosure, wherein M equals three (M=3), L equals three times Δ samples (L=3·Δ), Δ is a generic positive integer number and N equals four times Δ samples (N=4·Δ). The overlap ratio of the DFA of FIG. 6 corresponds to one-fourth $$\left(\frac{m}{(M+m)} = \frac{1}{4}\right).$$

The above description of the DFA according to the first aspect and its implementation forms is correspondingly valid for the DFA of FIG. 6.

The DFA of FIG. 6 corresponds to the DFA 1 of FIG. 1, wherein FIG. 6 shows an implementation form of the first part 2 of the DFA. The above description of the DFA 1 of FIG. 1 is also valid for the DFA according to FIG. 6.

As shown in FIG. 6, the DFA, in particular the first part 2 of the DFA, is configured to perform the following steps for generating the M discrete Fourier transforms $X_1, \ldots, X_M$:

In a first step S61 the DFA is configured to split a current block S respectively S(μ) into M subblocks each of the size Δ, wherein each subblock comprises Δ samples of the current block S. A subblock of the size Δ corresponds to a sequence of samples of the length A. For example, as shown in FIG. 6, M may be equal to three (M=3). Thus, the current block S corresponds to a sequence of 3 Δ samples $[z_{k-2}, z_{k-1}, z_k]$, wherein $z_k$ is the subblock of Δ samples at the end of the sequence of the 3·Δ samples of the current block S and $z_{k-2}$ is the subblock of A samples at the beginning of the sequence of the 3·Δ samples of the current block S. Thus, in the sequence of blocks received by the DFA, the subblock of samples $z_{k-2}$ corresponds to the samples of the current block S that follow directly after the last subblock of samples $z_{k-3}$ of the directly previous block that was received by the DFA directly before the current block S. The directly previous block corresponds to the sequence of the 3·Δ samples $[z_{k-5}, z_{k-4}, z_{k-3}]$ (in case M=3).

As shown in FIG. 6, in the first step S61 the DFA is configured to split the current block S corresponding to the sequence $[z_{k-2}, z_{k-1}, z_k]$ (in case M=3) into M subblocks $z_k$, $z_{k-1}$, and $z_{k-2}$ each of the size Δ, wherein each subblock comprises Δ samples of the current block S.

In a second step S62 following the first step S61, the DFA is configured to zero-pad each subblock to a zero-padded sequence of the size Γ comprising Γ samples (Γ<N), wherein each zero-padded sequence comprises Δ samples of the corresponding subblock and Γ-Δ zeros. Further, in the second step S62 the DFA is configured to jointly approximate on the basis of the M zero-padded sequences, M further discrete Fourier transforms (input-pruned Fourier transforms) of the size N (N=Δ·(M+m)) by using the M DFT filters (each DFT filter is implemented by a DFT algorithm of the size Γ and an interpolation algorithm). For example m may equal to one (m=1). In this case, as shown in FIG. 6, starting from the subblock $z_k$ the further discrete Fourier transform $DFT([0, 0, 0, z_k])$, starting from the subblock $z_{k-1}$, the further discrete Fourier transform $DFT([0, 0, 0, z_{k-1}])$ and from the subblock $z_{k-2}$ the further discrete Fourier transform $DFT([0, 0, 0, z_{k-2}])$ may be generated in the second step S62. For a detailed description for the implementation of the second step S62 of the DFA according to an embodiment of the present disclosure reference is made to the description of FIG. 5.

The DFA is configured to generate the M (e.g. M=3) discrete Fourier transforms $X_1, X_2, X_3$ on the basis of the M further discrete Fourier transforms DFT([0, 0, 0, $z_k$]), DFT ([0, 0, 0, $z_{k-1}$]) and DFT([0, 0, 0, $z_{k-2}$]), generated in the second step S62, by performing a third step S63 following the second step S62 and a fourth step S64 following the third step S63. In the third step S63, the DFA is configured to delay the M further discrete Fourier transforms to generate M delayed further discrete Fourier transforms DFT([0, 0, 0, $z_{k-3}$]), DFT([0, 0, 0, $z_k$-4]), DFT([0, 0, 0, $z_k$5]). In the third step the M further discrete Fourier transforms are delayed in order to provide with the delayed versions enough samples of a directly previous block received by the DFA directly before the current block S or of more than one previous block received by the DFA before the current block S for generating the M discrete Fourier transforms $X_1, X_2$ and $X_3$.

In the fourth step S64, the DFA is configured to align and add one or more of the M delayed further discrete Fourier transforms DFT([0, 0, 0, $z_k$3]), DFT([0, 0, 0, $z_k$4]), DFT([0, 0, 0, $z_{k-5}$]) and one or more of the M further discrete Fourier transforms DFT([0, 0, 0, $z_k$]), DFT([0, 0, 0, $z_{k-1}$], DFT([0, 0, 0, $z_{k-2}$]) to generate the M discrete Fourier transforms $X_1$, $X_2$, $X_3$. The time shift necessary to align the one or more further discrete Fourier transforms and one or more delayed further discrete Fourier transforms is implemented in the frequency domain via a symbol-wise multiplication of the respective further discrete Fourier transforms and respective delayed further discrete Fourier transforms by suitable powers of the rotation vector $\rho\_1_{M+m}$, (which corresponds to $p\_1_4$ in case M=3 and m=1), as shown in the FIG. 6. The rotation vector may be as follows:

$$\rho\_1_{M+m} \triangleq \exp\left(j\frac{2\pi}{M+m}[0, 1, \ldots, N-1]\right),$$

where j is the imaginary unit. For a further description of the fourth step S64 of aligning and adding reference is made to the description of FIG. 4.

As shown in FIG. 6, a first discrete Fourier transform $X_1$ of the M discrete Fourier transforms $X_1$, $X_2$, $X_3$ (M=3) corresponds to the discrete Fourier transform of the sequence [$z_{k-3}$, $z_{k-2}$, $z_{k-1}$, $z_k$]. Thus, the first discrete Fourier transform $X_1$ corresponds to the discrete Fourier transform of a current overlap block of the current block S, wherein the current block S corresponds to the sequence [$z_{k-2}$, $z_{k-1}$, $z_k$] in the time domain and the corresponding overlap block corresponds to the sequence [$z_{k-3}$, $z_{k-2}$, $z_{k-1}$, $z_k$] in the time domain. Namely, as outlined above, the current overlap block comprises the samples of the corresponding current block and the N–L last consecutive samples of a directly previous block S that was received by the DFA directly before the respective current block S. Since in FIG. 6 it is assumed that M corresponds to three and m corresponds to one (M=3, m=1), N corresponds to 4·Δ samples and L corresponds to 3·Δ samples (N=(M+m) Δ=4·Δ and L=ΔM=3·Δ). Thus, according to FIG. 6, the current overlap block comprises the 3·Δ samples of the corresponding current block S and the last consecutive Δ samples (N–L=4·Δ–3·Δ=Δ) of a directly previous block S that was received by the DFA directly before the respective current block S. As outlined above, the last Δ samples of the directly previous block S corresponds to the samples $z_{k-3}$.

Further, as shown in FIG. 6, a second discrete Fourier transform $X_2$ of the M discrete Fourier transforms $X_1$, $X_2$, $X_3$ corresponds to the discrete Fourier transform of the sequence [$z_{k-4}$, $z_{k-3}$, $z_{k-2}$, $z_{k-1}$]. Thus, the second discrete Fourier transform $X_2$ corresponds to the discrete Fourier transform of a delayed version of the current overlap block S. In particular, this delayed version corresponds to the current overlap block delayed by Δ samples. Furthermore, as shown in FIG. 6, a third discrete Fourier transform $X_3$ of the M discrete Fourier transforms $X_1$, $X_2$, $X_3$ corresponds to the discrete Fourier transform of the sequence [$z_{k-5}$, $z_{k-4}$, $z_{k-3}$, $z_{k-2}$]. Thus, the third discrete Fourier transform $X_3$ corresponds to the discrete Fourier transform of a delayed version of the current overlap block S. In particular, this delayed version corresponds to the current overlap block delayed by 2Δ samples.

The above description is also valid in case M, m, and N have different values. FIG. 6 shows by way of example the case in which M=3 and m=1.

Therefore, the DFA according to FIG. 6 is configured to generate M discrete Fourier transforms $X_1$, $X_2$, $X_3$ (M=3) of a current overlap block [$z_{k-3}$, $z_{k-2}$, $z_{k-1}$, $z_k$] and of M–1 delayed versions (M–1=3–1=2) of the current overlap block [$Z_{k-4}$, $z_{k-3}$, $z_{k-2}$, $z_{k-1}$] and [$z_{k-5}$, $z_{k-4}$, $z_{k-3}$, $z_{k-2}$].

Thus, the DFA of FIG. 6 is configured to provide the M discrete Fourier transforms $X_1, \ldots, X_M$ for a filtering by the compensation filter (shown in FIG. 2, but not shown in FIG. 6) of the DFA. According to the embodiment of FIG. 2 the step of overlapping and step of delaying are performed in the time domain. In contrast thereto, according to the embodiment of FIG. 6 the first step of overlapping and step of delaying is performed in the frequency domain. The filtering of the M discrete Fourier transforms $X_1, \ldots, X_M$ ($X_1, \ldots, X_3$ in case M=3) by the compensation filter of the DFA may be performed as described above with respect to FIGS. 1 and 2.

Figure 7B:
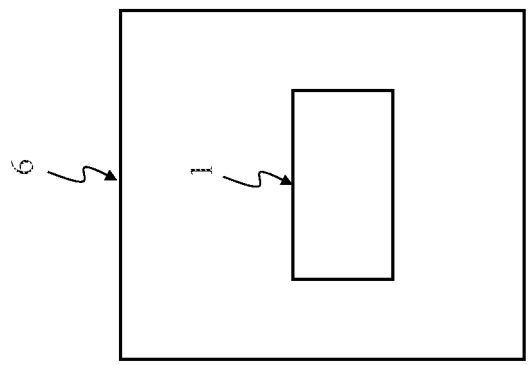
FIG. 7B shows a receiver according to an embodiment.
Figure 7A:
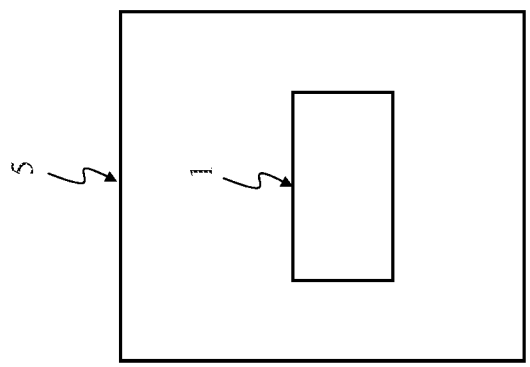
FIG. 7A shows a transmitter according to an embodiment.

FIG. 7A shows a transmitter according to an embodiment of the present disclosure.

The transmitter 5 of FIG. 7A is configured to transmit, on the basis of a digital signal, a modulated light signal via one or more optical fibers to a receiver (not shown in FIG. 7A). The transmitter 5 comprises a digital filter arrangement (DFA) 1 according to the first aspect or any of its implementation forms and is configured to pre-compensate group velocity dispersion (GVD) of the modulated light signal on the basis of the digital signal using the DFA 1. The above description with respect to the DFA according to the first aspect or any of its implementation forms and the above description of the FIGS. 1 to 6 is valid for the DFA 1 of the transmitter 5.

The above description with respect to the transmitter of the second aspect or any of its implementation forms is also valid for the transmitter 5 of FIG. 7A.

FIG. 7B shows a receiver according to an embodiment of the present disclosure.

The receiver 6 of FIG. 7B is configured to receive a modulated light signal via one or more optical fibers from a transmitter and to convert the received modulated light signal into a digital signal (not shown in FIG. 7B). The receiver 6 comprises a digital filter arrangement (DFA) 1 according to the first aspect or any of its implementation forms and is configured to compensate group velocity dispersion (GVD) of the received modulated light signal on the basis of the digital signal using the DFA 1. The above description with respect to the DFA according to the first aspect or any of its implementation forms and the above description of the FIGS. 1 to 6 is valid for the DFA 1 of the receiver 6.

The above description with respect to the receiver of the third aspect or any of its implementation forms is also valid for the receiver 6 of FIG. 7B.

FIG. 8 shows an optical transmission system (OTS) according to an embodiment of the present disclosure.

The OTS 7 of FIG. 8 comprises one or more optical fibers 10, a transmitter 8 and a receiver 9. The transmitter 8 is configured to transmit, on the basis of a first digital signal, a modulated light signal via the one or more optical fibers 10 to the receiver 9. The receiver 9 is configured to receive the modulated light signal via the one or more optical fibers 10 from the transmitter 8 and convert the received modulated light signal into a second digital signal.

The transmitter 8 may be a transmitter according to the second aspect or any of its implementation forms (such as the transmitter 5 of FIG. 7A), which is configured to pre-compensate group velocity dispersion (GVD) of the modulated light signal on the basis of the first digital signal using the digital filter arrangement (DFA) according to the first aspect or any of its implementation forms.

Alternatively or additionally, the receiver 9 may be a receiver according to the third aspect or any of its implementation forms (such as the receiver 6 of FIG. 7B), which is configured to compensate GVD of the received modulated light signal on the basis of the second digital signal using the DFA according to the first aspect or any of its implementation forms.

The above description with respect to the OTS of the fourth aspect or any of its implementation forms is also valid for the OTS 7 of FIG. 8.

The present disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A digital filter arrangement (DFA), comprising:
a receiver;
M discrete Fourier transform (DFT) filters, wherein M is a positive integer, wherein each DFT filter of the M DFT filters is implemented by a fast Fourier transform (FFT) algorithm of a size $\Gamma$ smaller than a size N and by an interpolation algorithm; and
a compensation filter, implemented by a delay network and a linear combination algorithm;
wherein the receiver is configured to:
receive a sequence of samples of a digital input signal in the time domain in the form of consecutive blocks of size L, wherein each block of the consecutive blocks comprises L consecutive samples of the digital input signal;
wherein the M DFT filters are configured to:
generate M discrete Fourier transforms of a current overlap block and of M−1 delayed versions of the current overlap block, wherein the current overlap block is of the size N and the size N is greater than the size L, wherein each generated discrete Fourier transform is of the size N and comprises N entries, the current overlap block comprises samples of a current block of the consecutive blocks and the N−L last consecutive samples of a directly previous block that was received by the DFA directly before the current block of the blocks, and
wherein the compensation filter is configured to:
filter the N entries of the generated M discrete Fourier transforms to generate an output discrete Fourier transform with N entries.

2. The DFA according to claim 1, further comprising:
an inverse discrete Fourier transformation (IDFT) filter, configured to generate, on the basis of the output discrete Fourier transform, an output block of size N.

3. The DFA according to claim 2, wherein the DFA is configured to:
generate an output block of the size L on the basis of the output block of the size N, by using an overlap-add or an overlap-save method.

4. The DFA according to claim 1, wherein the size L of each block is the product of M and $\Delta$, $L=M \cdot \Delta$, wherein M and $\Delta$ are each a positive integer.

5. The DFA according to claim 1, wherein:
the size N of the current overlap block is the product of $\Delta$ with the sum of M and m, $N=\Delta \cdot (M+m)$, wherein M, $\Delta$, and m are positive integers, and the product of $\Delta$ and m, $\Delta \cdot m$, corresponds to the number of last consecutive samples in the sequence of samples of the directly previous block.

6. The DFA according to claim 1, wherein the DFA is configured to
generate, on the basis of the current block, the current overlap block of the size N and greater than the size L; and
generate the M−1 delayed versions of the current overlap block; and
wherein the M DFT filters are configured to:
jointly approximate, on the basis of the current overlap block and the M−1 delayed versions of the current overlap block, the M discrete Fourier transforms.

7. The DFA according to claim 6, wherein the DFA is configured to generate the M−1 delayed versions of the current overlap block by progressively delaying the current overlap block in steps of $\Delta$ samples, wherein $\Delta$ is a positive integer.

8. The DFA according to claim 1, wherein the DFA is configured to
split the current block into M subblocks each of a size $\Delta$, wherein $\Delta$ is a positive integer, wherein each subblock comprises $\Delta$ consecutive samples of the current block; and
zero-pad each subblock of the M subblocks to a zero-padded sequence of the size $\Gamma$ comprising $\Gamma$ samples, wherein each zero-padded sequence comprises the $\Delta$ consecutive samples of the corresponding subblock and $\Gamma-\Delta$ zeros; and
wherein the M DFT filters are configured to:
jointly approximate, on the basis of the M zero-padded sequences, M further discrete Fourier transforms; and
generate the M discrete Fourier transforms by:
delaying the M further discrete Fourier transforms, and aligning and adding one or more of the M delayed further discrete Fourier transforms and one or more of the M further discrete Fourier transforms.

9. The DFA according to claim 8, wherein the M DFT filters are configured to perform the alignment by performing a symbol-wise multiplication of one or more delayed further discrete Fourier transforms or one or more further discrete Fourier transforms by a rotation vector.

10. The DFA according to claim 8, wherein the DFA is configured to:
grouping the Δ samples of each subblock of the M subblocks into two parts of samples;
carry out the zero-padding of each subblock to a zero-padded sequence of the size Γ by adding Γ−Δ zeros between the two parts of samples; and
wherein the M DFT filters are configured to jointly approximate, on the basis of the M zero-padded sequences, the M further discrete Fourier transforms.

11. The DFA according to claim 10, wherein each of the M DFT filters are configured to jointly approximate, on the basis of the M zero-padded sequences, the M further discrete Fourier transforms by:
transforming each zero-padded sequence by the FFT algorithm of the size Γ to a discrete Fourier transform of the size Γ;
interpolating the Γ samples of each discrete Fourier transform of the size Γ to N samples of another discrete Fourier transform of the size N by a low-pass filter; and
performing a symbol-wise multiplication of the samples of each other discrete Fourier transform by a rotation vector to obtain the respective further discrete Fourier transform.

12. The DFA according to claim 1, wherein the compensation filter comprises N subfilters, wherein each subfilter is implemented by the delay network and the linear combination algorithm; and
wherein the DFA is configured to perform a filtering on a kth entry of one or more of the generated M discrete Fourier transforms by using a kth subfilter to generate a kth entry of the output Fourier transform, wherein each discrete Fourier transform comprises N entries.

13. The DFA according to claim 1, wherein the compensation filter comprises N subfilters, and a kth subfilter of the N subfilters is configured to generate a kth entry of the output Fourier transform as a linear combination of:
a kth entry of one or more first discrete Fourier transforms of the M discrete Fourier transforms; or
a kth entry of one or more delayed versions of one or more second discrete Fourier transforms of the M discrete Fourier transforms.

14. The DFA according to claim 13, wherein the kth subfilter is configured to perform the linear combination by weighting
the kth entry of the one or more first discrete Fourier transforms, or
the kth entry of the one or more delayed versions of the one or more second discrete Fourier transforms with a respective coefficient.

15. The DFA according to claim 13, wherein the kth subfilter is configured to generate the kth entry of each of the one or more delayed versions of each of the one or more second discrete Fourier transforms by delaying the kth entry of the respective second discrete Fourier transform using one or more integer delays.

16. An optical transmission system (OTS), comprising:
one or more optical fibers;
a transmitter; and
a receiver;
wherein the transmitter is configured to transmit, on the basis of a first digital signal, a modulated light signal via the one or more optical fibers to the receiver;
wherein the receiver is configured to receive the modulated light signal via the one or more optical fibers from the transmitter and convert the received modulated light signal into a second digital signal;
wherein:
the transmitter is configured to pre-compensate group velocity dispersion (GVD) of the modulated light signal on the basis of the first digital signal using a digital filter arrangement (DFA), or
the receiver is configured to compensate GVD of the received modulated light signal on the basis of the second digital signal using a DFA; and
wherein the DFA comprises:
a DFA receiver;
M discrete Fourier transform (DFT) filters, wherein M is a positive integer, wherein each DFT filter of the M DFT filters is implemented by a fast Fourier transform (FFT) algorithm of a size T smaller than a size N and by an interpolation algorithm; and
a compensation filter, implemented by a delay network and a linear combination algorithm;
wherein the DFA receiver is configured to:
receive a sequence of samples of a digital input signal in the time domain in the form of consecutive blocks of size L, wherein each block of the consecutive blocks comprises L consecutive samples of the digital input signal;
wherein the M DFT filters are configured to:
generate M discrete Fourier transforms of a current overlap block and of M−1 delayed versions of the current overlap block, wherein the current overlap block is of the size N and the size N is greater than the size L, wherein each generated discrete Fourier transform is of the size N and comprises N entries, the current overlap block comprises samples of a current block of the blocks and the N−L last consecutive samples of a directly previous block that was received by the DFA directly before the current block of the blocks, and
wherein the compensation filter is configured to:
filter the N entries of the generated M discrete Fourier transforms to generate an output discrete Fourier transform with N entries.

17. The OTS according to claim 16, wherein the DFA further comprises an inverse discrete Fourier transformation (IDFT) filter configured to generate, on the basis of the output discrete Fourier transform, an output block of size N.

18. The OTS according to claim 17, wherein the DFA is configured to generate an output block of the size L on the basis of the output block of the size N, by using an overlap-add or an overlap-save method.

19. A method, comprising:
receiving a sequence of samples of a digital input signal in the time domain in the form of consecutive blocks of size L, wherein each block comprises L consecutive samples of the digital input signal;
generating M discrete Fourier transforms wherein M is a positive integer, of a current overlap block and of M−1 delayed versions of the current overlap block by using M discrete Fourier transform (DFT) filters, wherein the current overlap block is of a size N greater than the size L, each generated discrete Fourier transform is of the size N and comprises N entries, the current overlap block comprises the samples of a current block and the N−L last consecutive samples of a directly previous block that was received directly before the current block, and each DFT filter of the M DFT filters is implemented by a fast Fourier transform (FFT) algorithm, of a size T smaller than the size N and by an interpolation algorithm; and filtering, by a compensation filter, the N entries of the generated M discrete Fourier transforms to generate an output discrete Fourier transform with N entries, wherein the compensation filter is implemented by a delay network and a linear combination algorithm.

20. A non-transitory computer readable medium storing executable program code which, when executed by a processor, causes the method according to claim 19 to be performed.

* * * * *

UNITED STATES PATENT AND TRADEMARK OFFICE
CERTIFICATE OF CORRECTION

PATENT NO. : 12,463,723 B2  
APPLICATION NO. : 18/146176  
DATED : November 4, 2025  
INVENTOR(S) : Calabro et al.

Page 1 of 1

It is certified that error appears in the above-identified patent and that said Letters Patent is hereby corrected as shown below:

In the Claims

In Column 28, in Claim 5, Line 24, delete "A with" and insert -- Δ with --.

In Column 30, in Claim 16, Line 16, delete "size T" and insert -- size ⌈ --.

In Column 30, in Claim 19, Line 66, delete "size T" and insert -- size ⌈ --.

Signed and Sealed this  
Twenty-third Day of December, 2025

John A. Squires  
*Director of the United States Patent and Trademark Office*